(12) United States Patent
Lin et al.

(10) Patent No.: US 11,015,291 B2
(45) Date of Patent: May 25, 2021

(54) FINE CELLULOSE FIBER AND PRODUCTION METHOD FOR SAME

(71) Applicant: KRI, INC., Kyoto (JP)

(72) Inventors: Lianzhen Lin, Kyoto (JP); Ayako Maruta, Kyoto (JP); Masanori Hori, Kyoto (JP)

(73) Assignees: FUTAMURA KAGAKU KABUSHIKI KAISHA, Nagoya (JP); ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/085,172

(22) PCT Filed: Mar. 16, 2017

(86) PCT No.: PCT/JP2017/010789
§ 371 (c)(1),
(2) Date: Sep. 14, 2018

(87) PCT Pub. No.: WO2017/159823
PCT Pub. Date: Sep. 21, 2017

(65) Prior Publication Data
US 2019/0093285 A1    Mar. 28, 2019

(30) Foreign Application Priority Data

Mar. 16, 2016 (JP) .............................. JP2016-052542
Apr. 22, 2016 (JP) .............................. JP2016-086124

(51) Int. Cl.
*D21C 3/20* (2006.01)
*D01F 2/00* (2006.01)
(Continued)

(52) U.S. Cl.
CPC ............... *D21C 3/20* (2013.01); *C08B 1/02* (2013.01); *C08B 3/02* (2013.01); *C08B 3/16* (2013.01);
(Continued)

(58) Field of Classification Search
CPC ................................... D21C 3/20; D01F 2/00
See application file for complete search history.

(56) References Cited

U.S. PATENT DOCUMENTS 4,161,423 A    7/1979  Wasser et al.
6,197,230 B1   3/2001  Pierre et al.
(Continued)

FOREIGN PATENT DOCUMENTS

CN    101139805 A    3/2008
CN    102834448 A    12/2012
(Continued)

OTHER PUBLICATIONS

Day et al, Donor numbers: Al quadrupole relaxation as a measure of solvent donicity towards the sodium ion, Nov. 4, 1982, Louisiana State University, p. 1719-1720 (Year: 1982).*
(Continued)

*Primary Examiner* — Eric Hug
*Assistant Examiner* — Elisa H Vera
(74) *Attorney, Agent, or Firm* — Sughrue Mion, PLLC

(57) ABSTRACT

Provided is a method of producing fine cellulose fibers that are nanosized, that have a high crystallinity degree, and that are less vulnerable to fiber shape damage, the method including impregnating cellulose with a fibrillation solution to fibrillate the cellulose without mechanical crushing, and modifying the cellulose. The method of producing cellulose microfibrils of the present invention includes impregnating cellulose with a fibrillation solution containing a carboxylic acid vinyl ester or an aldehyde and an aprotic solvent having (Continued)

a donor number of 26 or more to fibrillate the cellulose. The aldehyde is at least one kind of aldehyde selected from the group consisting of an aldehyde represented by the following formula (1), paraformaldehyde, cinnamaldehyde, perillaldehyde, vanillin, and glyoxal:

$$R^1\text{—CHO} \qquad (1)$$

where $R^1$ represents a hydrogen atom, an alkyl group having 1 to 16 carbon atoms, an alkenyl group, a cycloalkyl group, or an aryl group.

14 Claims, 11 Drawing Sheets

(51) Int. Cl.
| | | |
|---|---|---|
| C08B 3/20 | (2006.01) | |
| D21H 11/18 | (2006.01) | |
| C08B 3/16 | (2006.01) | |
| D21C 3/00 | (2006.01) | |
| D21C 3/04 | (2006.01) | |
| D21C 9/00 | (2006.01) | |
| D21H 11/20 | (2006.01) | |
| C08B 3/02 | (2006.01) | |
| C08B 1/02 | (2006.01) | |

(52) U.S. Cl.
CPC .............. C08B 3/20 (2013.01); D01F 2/00 (2013.01); D21C 3/003 (2013.01); D21C 3/04 (2013.01); D21C 9/005 (2013.01); D21H 11/18 (2013.01); D21H 11/20 (2013.01)

(56) References Cited

U.S. PATENT DOCUMENTS

| 8,871,056 | B2 | 10/2014 | Gane et al. |
|---|---|---|---|
| 9,309,385 | B2 | 4/2016 | Umemoto et al. |
| 9,725,583 | B2 | 8/2017 | Wu et al. |
| 10,294,371 | B2 | 5/2019 | Gane et al. |
| 2006/0173433 | A1* | 8/2006 | Laumer .................. A61L 15/60 604/372 |
| 2010/0151527 | A1 | 6/2010 | Endo et al. |
| 2011/0151180 | A1* | 6/2011 | Haupt ...................... B32B 5/16 428/106 |
| 2012/0107480 | A1 | 5/2012 | Gane et al. |
| 2012/0308624 | A1* | 12/2012 | Isogai ................... A01N 37/40 424/401 |
| 2013/0025920 | A1* | 1/2013 | Shimizu .................... C08J 3/09 174/258 |
| 2013/0338250 | A1 | 12/2013 | Umemoto et al. |
| 2014/0073776 | A1 | 3/2014 | Shiramizu et al. |
| 2014/0299019 | A1 | 10/2014 | Wu et al. |
| 2014/0370179 | A1 | 12/2014 | Gane et al. |
| 2015/0225550 | A1* | 8/2015 | Banzashi ............... D21H 11/18 106/163.01 |
| 2016/0032020 | A1* | 2/2016 | Ukita ....................... C08B 3/06 536/76 |

FOREIGN PATENT DOCUMENTS

| CN | 103534275 A | 1/2014 |
|---|---|---|
| JP | 54-116412 A | 9/1979 |
| JP | 2007-70797 A | 3/2007 |
| JP | 2008-274247 A | 11/2008 |
| JP | 2010-104768 A | 5/2010 |
| JP | 2011-16995 A | 1/2011 |
| JP | 2012-188654 A | 10/2012 |
| JP | 2013-43984 A | 3/2013 |
| JP | 2015-500354 A | 1/2015 |
| RU | 2 530 067 C2 | 10/2014 |
| WO | 2016-010016 A1 | 1/2016 |

OTHER PUBLICATIONS

Martine Hubbe, Mini-Encyclopedia of Papermaking Wet-End Chemistry, Aug. 24, 2019, NC State Univeristy (Year: 2019).*
International Search Report for PCT/JP2017/010789 dated Jun. 6, 2017 [PCT/ISA/210].
Communication dated Apr. 9, 2019 by the Russian Patent Office in application No. 2018136093/05.
Communication dated Oct. 21, 2020 from the China National Intellectual Property Administration in Application No. 201780017957.9.
Communication dated Mar. 16, 2021 from the Japanese Patent Office in Application No. 2019-223329.

* cited by examiner

[Fig.1]
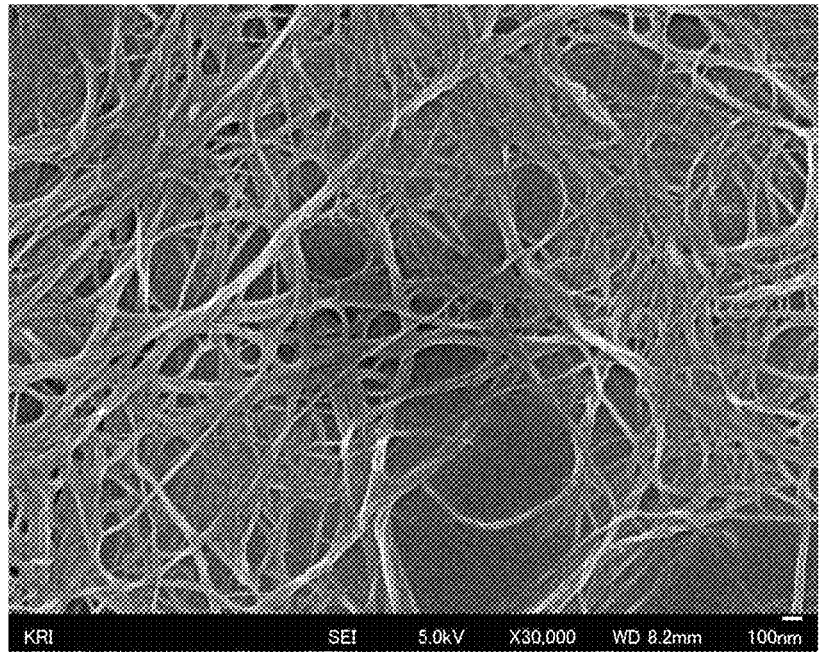
[Fig.2]
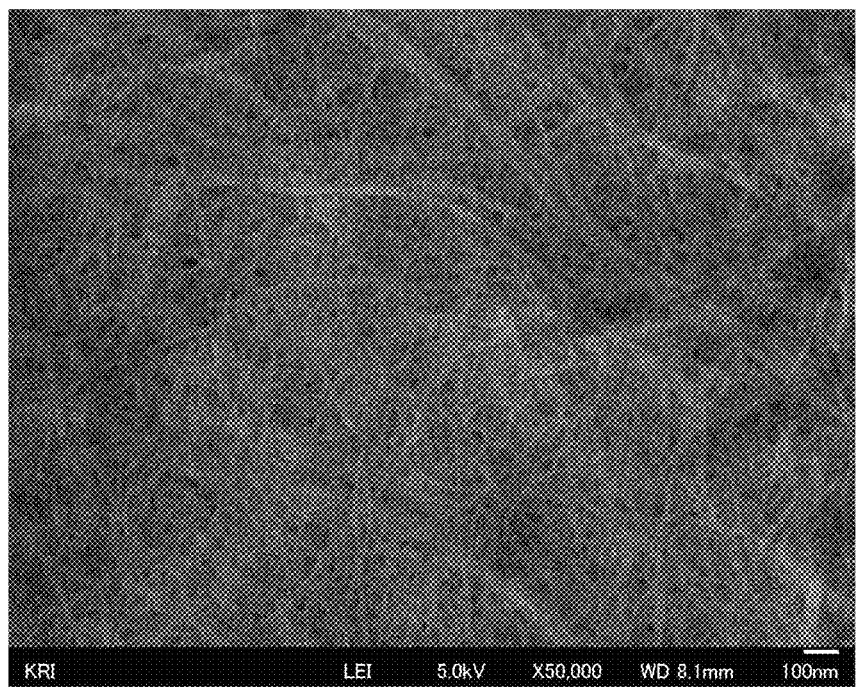

[Fig.3]
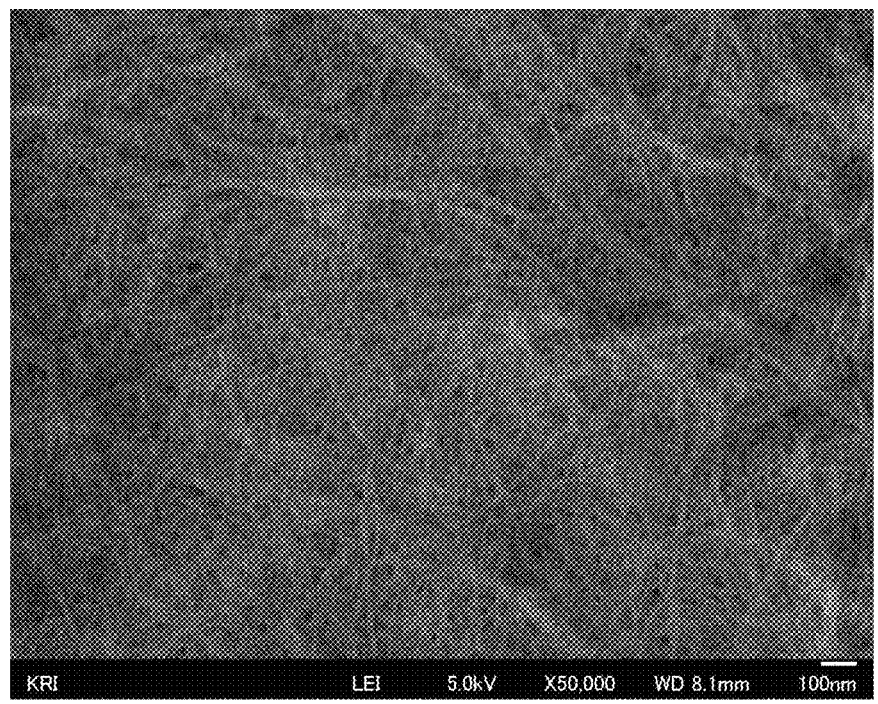
[Fig.4]
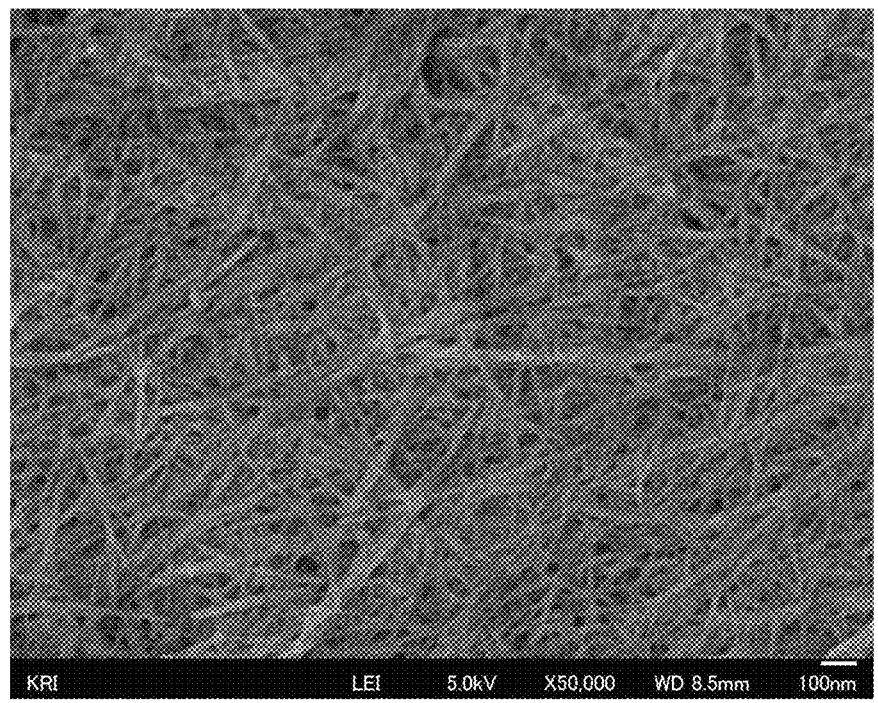

[Fig.5]
[Fig.6]

[Fig.7]
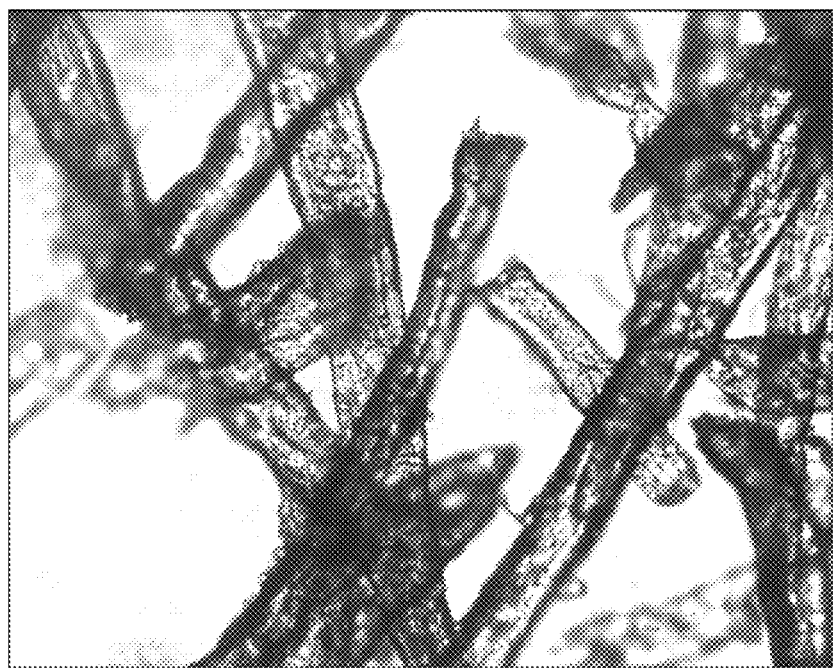

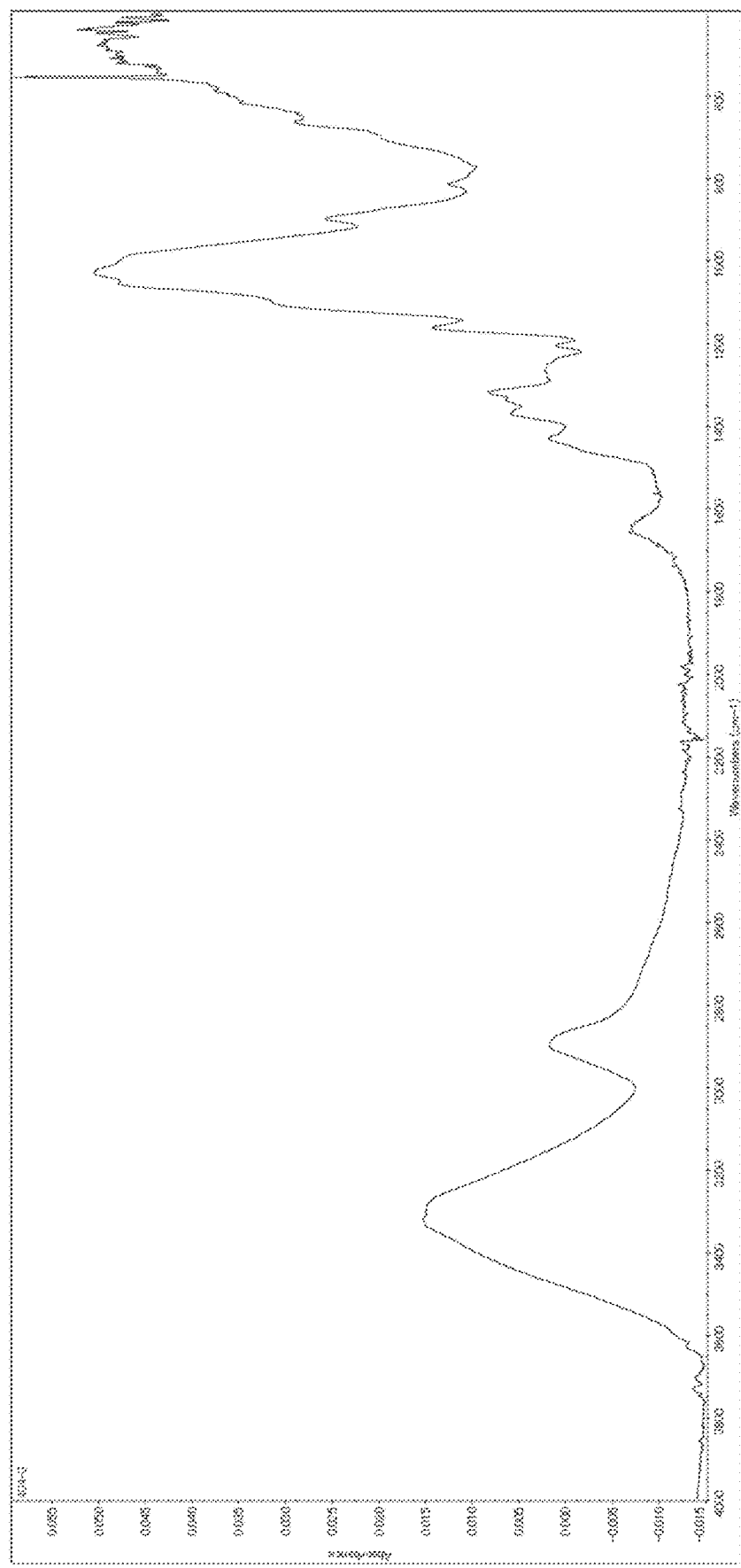
[Fig. 8]

[Fig.9]
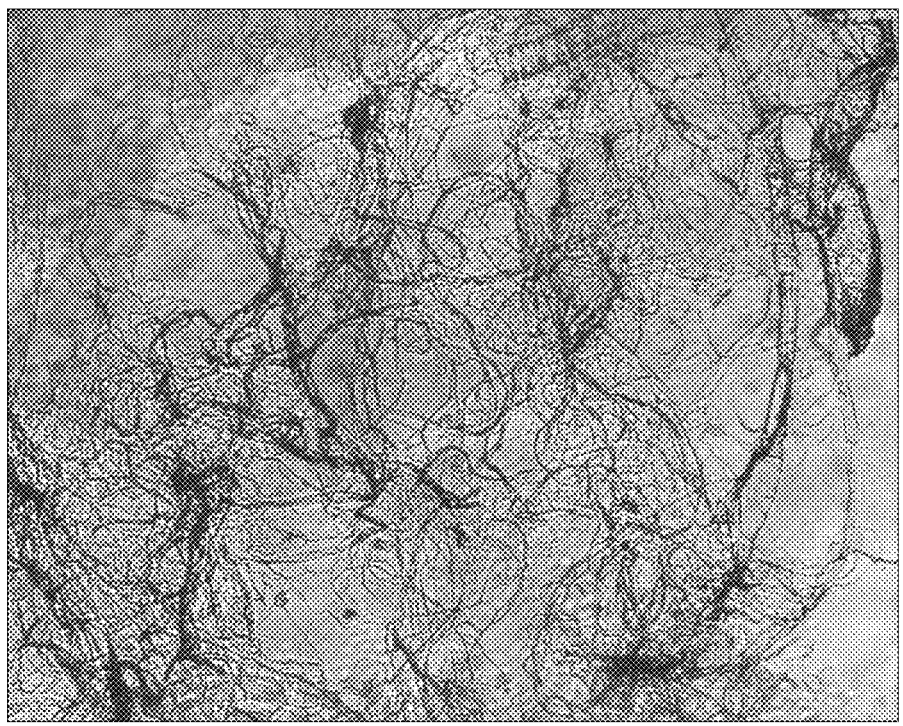
[Fig.10]
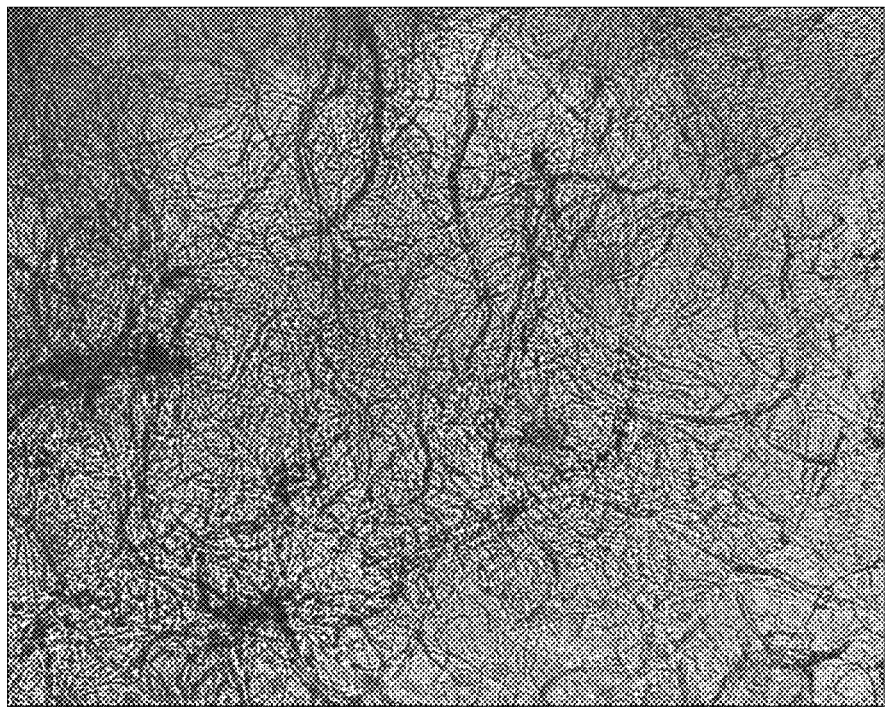

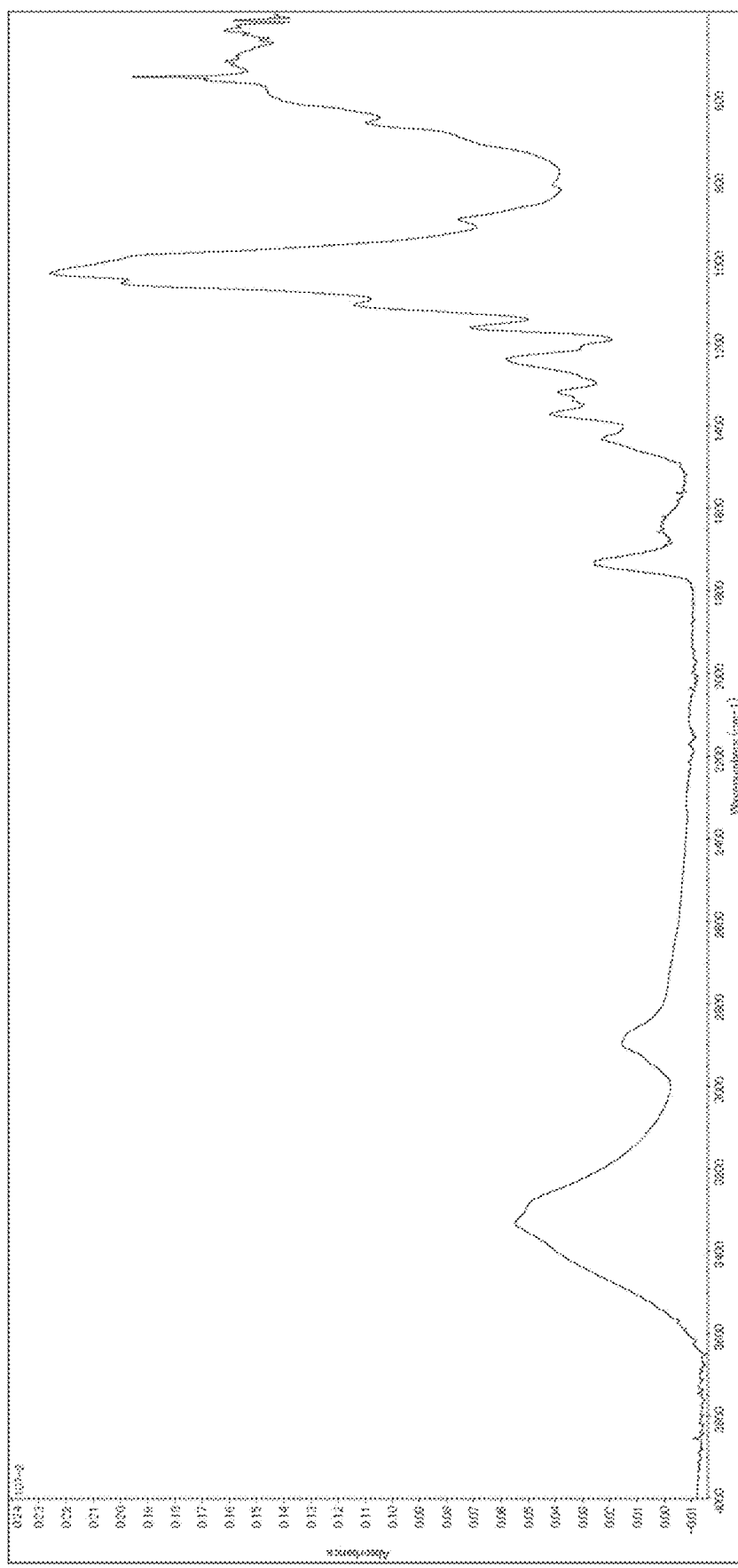
[Fig. 11]

[Fig. 12]
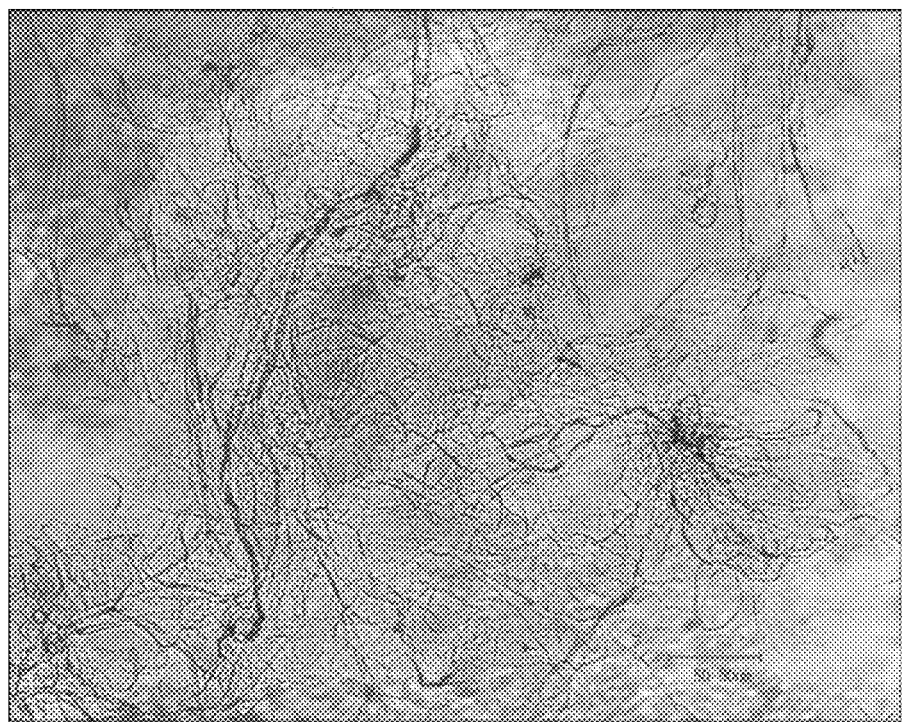

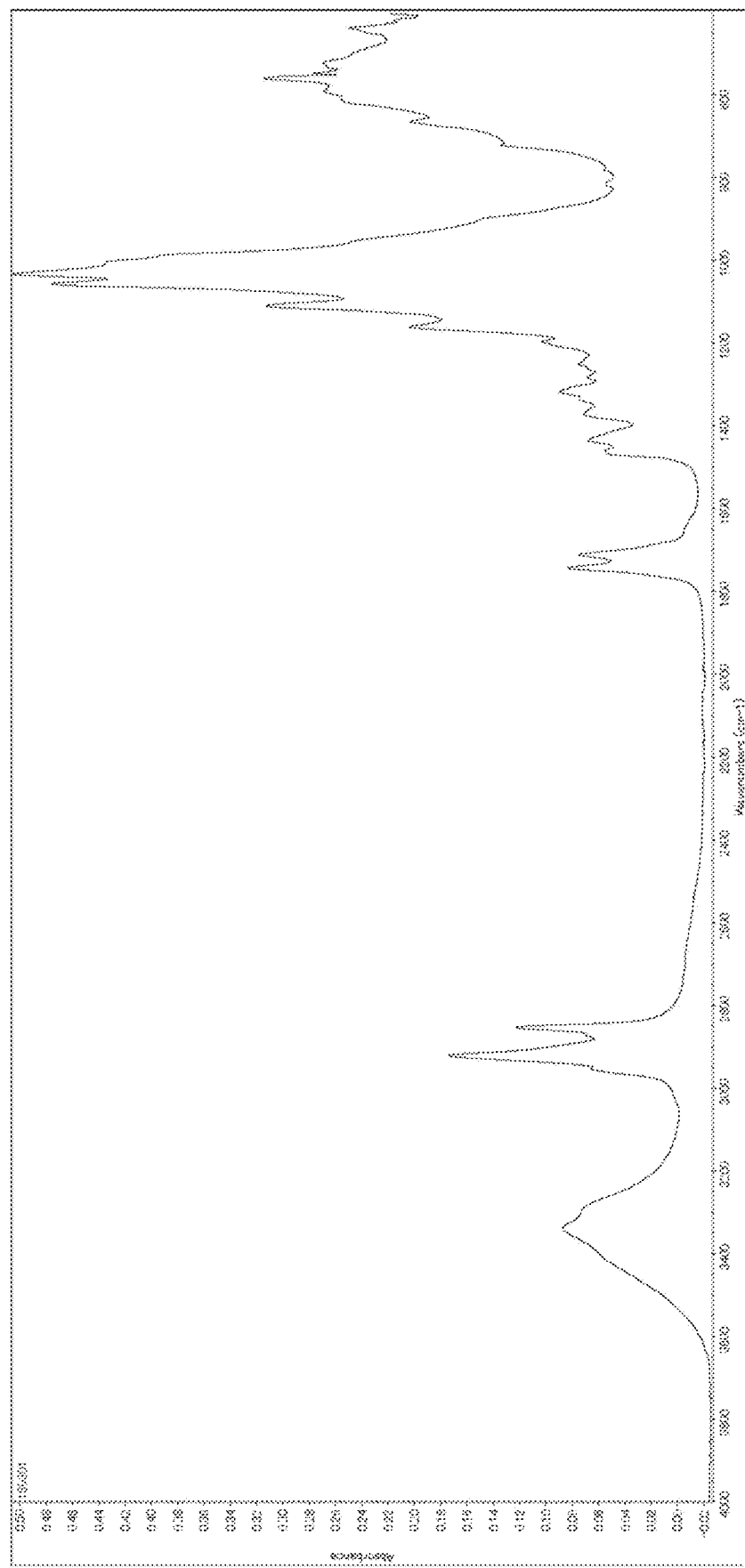
[Fig. 13]

[Fig.14]

[Fig.15]
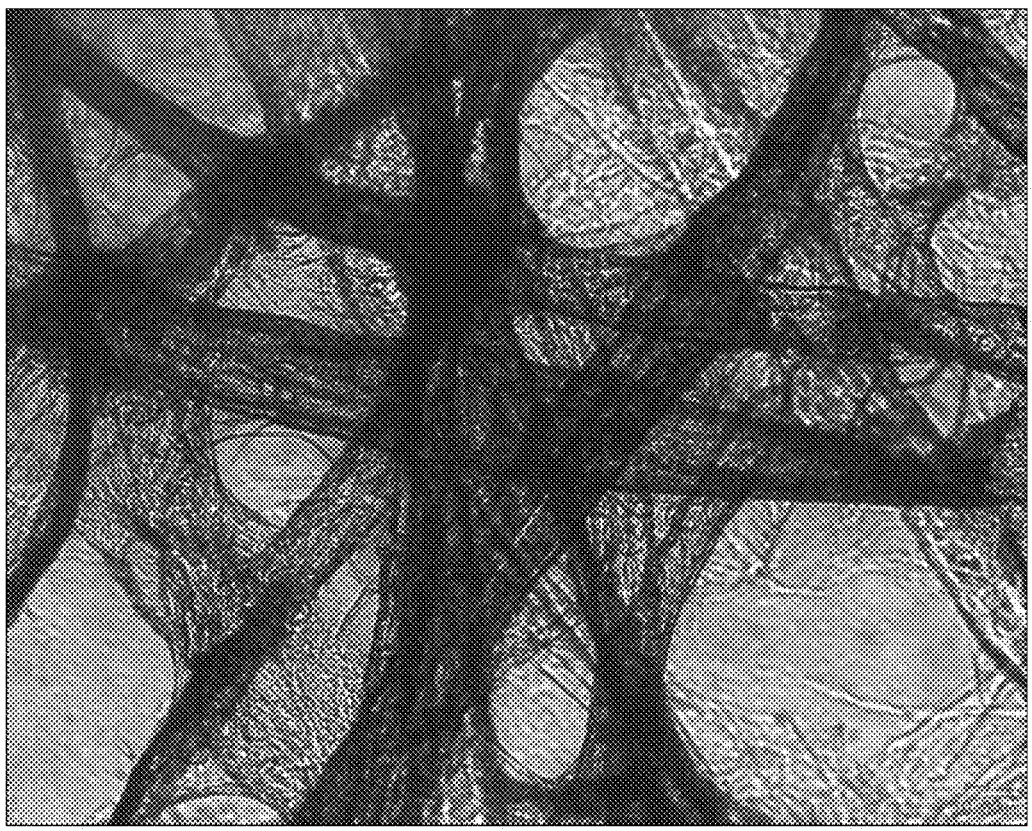

FINE CELLULOSE FIBER AND PRODUCTION METHOD FOR SAME

CROSS REFERENCE TO RELATED APPLICATIONS

This application is a National Stage of International Application No. PCT/JP2017/010789, filed on Mar. 16, 2017, which claims priority from Japanese Patent Application Nos. 2016-052542, filed on Mar. 16, 2016, and 2016-086124, filed on Apr. 22, 2016.

TECHNICAL FIELD

The present invention relates to a fine cellulose fiber and a method of producing the microfibril.

BACKGROUND ART

A cellulose fiber (cell wall unit) is an assembly of fine cellulose fibers (microfibrils). The microfibrils have been socially attracting close attention as a reinforcing material because the microfibrils have mechanical characteristics comparable to those of steel and have nanostructures each having a diameter of from about 2 nm to about 20 nm. However, the fine cellulose fibers are bound together through hydrogen bonds therebetween. Accordingly, in order that the fine cellulose fibers may be drawn out, the hydrogen bonds need to be cleaved to separate the microfibrils (hereinafter referred to as "fibrillation"). Accordingly, a mechanical fibrillation method involving applying an intense physical force has been used.

An underwater mechanical fibrillation method has been known as a method of producing cellulose nanofibers. In the method, cellulose is swollen with water to be brought into a soft state, and is fibrillated into nanofibers by strong mechanical shearing with, for example, a high-pressure homogenizer or a water jet. Natural cellulose microfibrils each include a crystalline zone and a noncrystalline zone, and when the noncrystalline zone absorbs a swelling solvent, such as water, to be brought into a swollen state, the zone is deformed by strong shearing. Accordingly, damage is present in the resultant fine cellulose fibers, and hence the fine cellulose fibers are of such shapes as to be liable to be entangled and caught with each other.

In addition, when a strong mechanical pulverization method involving using, for example, a ball mill is used, a mechanochemical reaction intrinsic to a solid state may occur. The reaction makes the breakage or dissolution of the crystal structure of the cellulose inevitable. As a result, a yield reduces and the crystallinity degree of fibers to be obtained reduces in some cases.

Another problem of the underwater fibrillation is that in order that the resultant cellulose microfibrils and a resin may be composited with each other, after the fibrillation, the cellulose microfibrils and the resin need to be dehydrated and subjected to treatment, such as surface hydrophobic modification. The dehydration step requires high energy.

In addition, a method involving swelling and/or partially dissolving a cellulose-based substance with a mixed solvent containing an ionic liquid and an organic solvent, and then esterifying the resultant has been known as a method of producing fine cellulose fibers having esterified surfaces (Patent Literature 1). However, when the mixed solvent containing the ionic liquid and the organic solvent of Patent Literature 1 is used, there occurs a problem in that cost concerning the recovery and reuse of the ionic liquid is high.

In addition, a method involving mixing cellulose and an organic solvent, adding an esterifying agent to the mixture, and then performing an esterification reaction together with strong mechanical crushing to esterify and dissociate the surface of the cellulose has been known as a method of producing fine cellulose fibers having esterified surfaces (Patent Literature 2). However, a solution for fibrillation containing the esterifying agent and the organic solvent has low permeability into the cellulose, and is hence hardly impregnated into the cellulose during mechanical pulverization treatment. Therefore, chemical fibrillation is also not performed in the method, and hence the fibers are produced by a mechanical fibrillation method requiring a strong mechanical force. Strong mechanical crushing may damage cellulose nanofibers. In addition, the organic solvent and the esterifying agent are more hardly impregnated into a deeper portion of a cellulose fiber from its surface, and hence the inside of the cellulose fiber is hardly subjected to esterification modification. Accordingly, it is assumed that fine fibers in the cellulose fiber are fibrillated by mechanical fibrillation, but their surfaces can be hardly modified. In addition, a method of producing fine cellulose fibers involving modification with a surface aromatic substituent has been known (Patent Literature 3). However, cellulose cannot be fibrillated by the chemical modification step alone, and hence a strong mechanical fibrillation step is required.

CITATION LIST

Patent Literature

[PTL 1] JP 2010-104768 A
[PTL 2] JP 2015-500354 A
[PTL 3] JP 2011-16995 A

SUMMARY OF INVENTION

Technical Problem

The present invention provides a method of producing fine cellulose fibers that are nanosized, that have a high crystallinity degree, and that are less vulnerable to fiber shape damage, the method being an energy-saving method that does not require any strong physical pulverization, and a method of producing modified fine cellulose fibers formed of such fine fibers.

Solution to Problem

The inventors of the present invention have made extensive investigations for achieving the object, and as a result, have found a method of producing fine cellulose fibers that are nanosized, that have a high crystallinity degree, and that are less vulnerable to fiber shape damage, the method including impregnating cellulose with a fibrillation solution containing a carboxylic acid vinyl ester or an aldehyde to fibrillate the cellulose without mechanical crushing.

A method of producing fine cellulose fibers includes impregnating cellulose with a fibrillation solution containing an aprotic solvent having a donor number of 26 or more and a carboxylic acid vinyl ester or an aldehyde to fibrillate the cellulose. The aldehyde is at least one kind of aldehyde selected from the group consisting of an aldehyde represented by the following formula (1), paraformaldehyde, cinnamaldehyde, perillaldehyde, vanillin, and glyoxal:

$$R^1\text{—CHO} \tag{1}$$

where $R^1$ represents a hydrogen atom, an alkyl group having 1 to 16 carbon atoms, an alkenyl group, a cycloalkyl group, or an aryl group.

In one embodiment of the present invention, a content of the carboxylic acid vinyl ester or the aldehyde is from 0.05 wt % to 50 wt % with respect to an entirety of the fibrillation solution.

In one embodiment of the present invention, the aprotic solvent having a donor number of 26 or more is at least one kind selected from the group consisting of a sulfoxide, a pyridine, a pyrrolidone, and an amide.

In one embodiment of the present invention, the aldehyde is at least one kind selected from the group consisting of formaldehyde, paraformaldehyde, acetaldehyde, propionaldehyde, butanal, isobutanal, 2-methylbutanal, pentanal, hexanal, heptanal, octanal, nonanal, decanal, acrolein, benzaldehyde, cinnamaldehyde, perillaldehyde, vanillin, and glyoxal.

In one embodiment of the present invention, the carboxylic acid vinyl ester is at least one kind selected from the group consisting of vinyl acetate, vinyl propionate, vinyl butyrate, vinyl caproate, vinyl cyclohexanecarboxylate, vinyl caprylate, vinyl caprate, vinyl laurate, vinyl myristate, vinyl palmitate, vinyl stearate, vinyl pivalate, vinyl octylate, divinyl adipate, vinyl methacrylate, vinyl crotonate, vinyl pivalate, vinyl octylate, vinyl benzoate, and vinyl cinnamate.

In one embodiment of the present invention, the carboxylic acid vinyl ester comprises a compound represented by the following formula (2):

$$R^2\text{---COO---CH}=\text{CH}_2 \quad (2)$$

where $R^2$ represents an alkyl group having 1 to 24 carbon atoms, an alkylene group, a cycloalkyl group, or an aryl group.

In one embodiment of the present invention, the fibrillation solution further contains a cellulose modification reaction agent.

In one embodiment of the present invention, the cellulose modification reaction agent is at least one kind selected from the group consisting of a carboxylic acid halide, a carboxylic acid anhydride, a carboxylic acid, an isocyanate, an epoxy, and an alkyl halide.

In one embodiment of the present invention, the fibrillation solution further contains an acid catalyst or a base catalyst.

In one embodiment of the present invention, the acid catalyst is at least one kind selected from the group consisting of paratoluenesulfonic acid, pyridinium paratoluenesulfonate, an inorganic acid, and an organic acid.

In one embodiment of the present invention, the base catalyst is at least one kind selected from the group consisting of: a carbonate of an alkali metal or an alkaline earth metal; a hydrogen carbonate of an alkali metal or an alkaline earth metal; a carboxylate of an alkali metal or an alkaline earth metal; a borate of an alkali metal or an alkaline earth metal; a phosphate of an alkali metal or an alkaline earth metal; a hydrogen phosphate of an alkali metal or an alkaline earth metal; a tetraalkylammonium acetate of an alkali metal or an alkaline earth metal; a pyridine; an imidazole; and an amine.

In one embodiment of the present invention, a content of the acid catalyst or the base catalyst is from 0.001 wt % to 30 wt % with respect to an entirety of the fibrillation solution.

In one embodiment of the present invention, a weight ratio between the cellulose and the fibrillation solution is from 0.5/99.5 to 25/75.

According to another aspect of the present invention, there is provided surface-modified fine cellulose fibers. Surface-modified fine cellulose fibers have an average fiber diameter of from 2 nm to 800 nm and an aspect ratio of from 40 to 1,000, and which are dispersible in an organic solvent or a resin having a SP value of 10 or less.

Advantageous Effects of Invention

According to the present invention, the cellulose is fibrillated by impregnating the cellulose with the fibrillation solution containing the aprotic solvent having a donor number of 26 or more and the carboxylic acid vinyl ester or the aldehyde without strong fibrillation with, for example, a high-pressure homogenizer or a water jet. Accordingly, damage to cellulose microfibrils is reduced, and hence fine cellulose fibers having a large aspect ratio can be produced. Further, surface-modified fine cellulose fibers can be produced by adding the catalyst or the modification reaction agent and the catalyst to the fibrillation solution to subject hydroxy groups on the surfaces of the microfibrils to a modification reaction. In the present invention, the fibrillation solution is impregnated into the cellulose to modify the surfaces of the microfibrils while cleaving hydrogen bonds between fibers, between lamellae, and between the microfibrils. Accordingly, the cellulose is fibrillated without the breakage of the crystal structure of naturally-derived cellulose and microfibril structures, and the surfaces of the microfibrils can be efficiently modified. Accordingly, fine cellulose fibers that are nanosized, that have a high crystallinity degree, that are less vulnerable to fiber shape damage, and that have a large aspect ratio can be simply and efficiently produced by an energy-saving method. The fine cellulose fibers and the modified fine cellulose fibers obtained by the production method of the present invention are each excellent in redispersibility in a solvent or a resin. The fibrillation solution of the present invention is aprotic, and hence the hydroxy groups on the surfaces of the fine cellulose fibers can react with various modification reaction agents. Accordingly, various modification functional groups can be introduced in accordance with applications. For example, the introduction of a hydrophobic functional group can further improve an affinity between the fine cellulose fibers and an organic medium, such as a resin. In addition, when a terminal of a modification functional group is modified with a modification reaction agent having a reactive group, such as an acrylic group, an epoxy group, an isocyanate group, or a vinyl group, the surfaces of the cellulose microfibrils to be obtained have reactive groups. Accordingly, the functionality and applications of the fine cellulose fibers can be further extended. For example, an improvement in reinforcing effect can be expected from an improvement in interfacial adhesive property by the occurrence of a chemical reaction between the fine cellulose fibers and a resin at the time of their compositing.

Further, in the method of producing fine cellulose fibers of the present invention, a cellulose substance can be fibrillated without the use of strong fibrillation means, such as a high-pressure homogenizer or a water jet. Accordingly, the fine cellulose fibers to be obtained have structures close to those of natural microfibrils and are less vulnerable to damage, and hence each have high strength.

BRIEF DESCRIPTION OF DRAWINGS

FIG. 1 is a SEM photograph of fine cellulose fibers obtained in Example 1 (at a magnification of 50,000).

FIG. 2 is a SEM photograph of fine cellulose fibers obtained in Example 2 (at a magnification of 50,000).

FIG. 3 is a SEM photograph of fine cellulose fibers obtained in Example 3 (at a magnification of 50,000).

FIG. 4 is a SEM photograph of fine cellulose fibers obtained in Example 10 (at a magnification of 50,000).

FIG. 5 is an optical microscope photograph of cellulose fibers obtained in Comparative Example 1 (at an optical magnification of 40).

FIG. 6 is an optical microscope photograph of cellulose fibers obtained in Comparative Example 2 (at an optical magnification of 40).

FIG. 7 is an optical microscope photograph of cellulose fibers obtained in Comparative Example 3 (at an optical magnification of 40).

FIG. 8 is the IR spectrum of fine cellulose fibers obtained in Example 12.

FIG. 9 is an optical microscope image of the fine cellulose fibers obtained in Example 12 (at a magnification of 400).

FIG. 10 is an optical microscope image of fine cellulose fibers obtained in Example 15 (at a magnification of 400).

FIG. 11 is the IR spectrum of the fine cellulose fibers obtained in Example 15.

FIG. 12 is an optical microscope image of fine cellulose fibers obtained in Example 18 (at a magnification of 400).

FIG. 13 is the IR spectrum of the fine cellulose fibers obtained in Example 18.

FIG. 14 is an optical microscope image of cellulose microfibrils obtained in Example 19 (at a magnification of 400).

FIG. 15 is an optical microscope image of fine cellulose fibers obtained in Comparative Example 6 (at a magnification of 400).

DESCRIPTION OF EMBODIMENTS

A. Outline of the Present Invention

In a method of producing fine cellulose fibers of the present invention, a fibrillation solution containing an aprotic polar solvent having a donor number of 26 or more and a carboxylic acid vinyl ester or an aldehyde is used. The aldehyde is at least one kind of aldehyde (hereinafter referred to as "aldehyde") selected from the group consisting of an aldehyde represented by the following formula (1), paraformaldehyde, cinnamaldehyde (cinnamic aldehyde), perillaldehyde, vanillin, and glyoxal (dialdehyde):

$$R^1\text{—CHO} \qquad (1)$$

where $R^1$ represents a hydrogen atom, an alkyl group having 1 to 16 carbon atoms, an alkenyl group, a cycloalkyl group, or an aryl group.

The production method of the present invention includes impregnating cellulose with the fibrillation solution to fibrillate the cellulose. The fibrillation solution is impregnated into the cellulose to cleave hydrogen bonds between microfibrils while swelling the cellulose, and hence the microfibrils can fibrillate by themselves to provide fine cellulose fibers. Accordingly, the cellulose is fibrillated without the use of strong fibrillation equipment, such as a high-pressure homogenizer or a water jet, and without fibrillation by mechanical fibrillation or crushing, and hence fine cellulose fibers that are nanosized, that have a high crystallinity degree, and that are less vulnerable to fiber shape damage are obtained.

In addition, the fibrillation solution is not impregnated into the crystalline zones (domains) of the microfibrils, and hence the fine cellulose fibers to be obtained are less vulnerable to damage and have structures close to those of natural microfibrils. At the same time, in the production method of the present invention, the cellulose can be fibrillated without the use of mechanical fibrillation means based on the action of a strong shear force, and hence damage by physical action is reduced. Accordingly, the fine cellulose fibers and modified fine cellulose fibers to be obtained may each hold high strength. Further, the fine cellulose fibers and the modified fine cellulose fibers each have low surface roughness, and hence can be easily redispersed in a solvent or a resin even when dried once.

B. Fibrillation Solution

The fibrillation solution to be used in the production method of the present invention contains the aprotic polar solvent having a donor number of 26 or more and the carboxylic acid vinyl ester or the aldehyde. The aldehyde is at least one kind of aldehyde selected from the group consisting of an aldehyde represented by the following formula (1), paraformaldehyde, cinnamaldehyde (cinnamic aldehyde), perillaldehyde, vanillin, and glyoxal (dialdehyde):

$$R^1\text{—CHO} \qquad (1)$$

where $R^1$ represents a hydrogen atom, an alkyl group having 1 to 16 carbon atoms, an alkenyl group, a cycloalkyl group, or an aryl group.

The content of the carboxylic acid vinyl ester or the aldehyde in the fibrillation solution is preferably from 0.05 wt % to 50 wt % with respect to the entirety of the fibrillation solution. When the content of the carboxylic acid vinyl ester or the aldehyde is less than 0.05 wt %, there is a risk in that the fibrillation is insufficient or the modification ratio of the modified fine cellulose fibers is not sufficient. In addition, when the content of the carboxylic acid vinyl ester or the aldehyde is more than 50 wt %, the impregnability of the fibrillation solution into the cellulose may reduce. The content of the carboxylic acid vinyl ester or the aldehyde is more preferably from 1 wt % to 40 wt %, still more preferably from 2 wt % to 30 wt %. When the content falls within such range, balance between the impregnability of the solution into a space between the microfibrils and the reactivity thereof with a hydroxy group of the cellulose may be further improved.

The following modes of the fibrillation solution of the present invention are each described in detail below: the mode in which the solution contains the carboxylic acid vinyl ester; and the mode in which the solution contains the aldehyde.

B-1. Fibrillation Solution Containing Carboxylic Acid Vinyl Ester

In one embodiment, the fibrillation solution of the present invention contains the carboxylic acid vinyl ester and the aprotic polar solvent having a donor number of 26 or more. The carboxylic acid vinyl ester can also function as a cellulose modification reaction agent.

B-1-1. Carboxylic Acid Vinyl Ester

Any appropriate carboxylic acid vinyl ester may be used as the carboxylic acid vinyl ester. The carboxylic acid vinyl ester is preferably a compound represented by the following formula (2):

$$R^2\text{—COO—CH=CH}_2 \qquad (2)$$

where $R^2$ represents an alkyl group having 1 to 24 carbon atoms, an alkylene group, a cycloalkyl group, or an aryl group.

From the viewpoints of the fibrillation property of the cellulose and the reactivity with a hydroxy group of the cellulose, the carboxylic acid vinyl ester is preferably a lower aliphatic carboxylic acid vinyl ester in which $R^2$ in the formula (2) represents an alkyl group having 1 to 7 carbon atoms, more preferably a carboxylic acid vinyl ester in which $R^2$ represents an alkyl group having 1 to 5 carbon atoms, still more preferably a carboxylic acid vinyl ester in which $R^2$ represents an alkyl group having 1 to 4 carbon atoms. The use of such carboxylic acid vinyl ester can improve the impregnability into a space between the microfibrils and the reactivity with a hydroxy group of the cellulose.

In addition, from the viewpoint of the dispersibility of the cellulose microfibrils to be obtained in a hydrophobic solvent or a resin, a higher aliphatic carboxylic acid vinyl ester, a carboxylic acid vinyl ester having a cyclic aliphatic functional group, or a carboxylic acid vinyl ester having an aromatic functional group is preferred. When any such carboxylic acid vinyl ester is used, the carboxylic acid vinyl ester is preferably used in combination with a lower aliphatic carboxylic acid vinyl ester from the viewpoint that the impregnability into a space between the microfibrils and the reactivity with a hydroxy group of the cellulose are secured.

Specific examples of the carboxylic acid vinyl ester include vinyl acetate, vinyl propionate, vinyl butyrate, vinyl caproate, vinyl cyclohexanecarboxylate, vinyl caprylate, vinyl caprate, vinyl laurate, vinyl myristate, vinyl palmitate, vinyl stearate, vinyl pivalate, vinyl octylate, divinyl adipate, vinyl methacrylate, vinyl crotonate, vinyl pivalate, vinyl octylate, vinyl benzoate, and vinyl cinnamate. Those compounds may be used alone or in combination thereof.

B-1-2. Aprotic Polar Solvent

An aprotic polar solvent having a donor number of 26 or more may be used as the aprotic polar solvent. The donor number of the aprotic polar solvent is preferably from 26 to 35, more preferably from 26.5 to 33, still more preferably from 27 to 32. When the donor number is less than 26, the impregnability of the fibrillation solution into a space between the microfibrils may not be sufficiently improved. The donor number is disclosed in the literature "Netsu Sokutei 28(3), 2001, P 135-143," the description of which is incorporated herein by reference.

Any appropriate solvent may be used as the aprotic polar solvent. Examples thereof include a sulfoxide, a pyridine, a pyrrolidone, and an amide. Those solvents may be used alone or in combination thereof.

The aprotic polar solvent is preferably at least one kind selected from the group consisting of dimethyl sulfoxide (DMSO) (donor number: 29.8), pyridine (donor number: 33.1), N,N-dimethylacetamide (donor number: 27.8), N,N-dimethylformamide (donor number: 26.6), and N-methyl-2-pyrrolidone (donor number: 27.3). The use of any such solvent can promote the impregnability of the fibrillation solution into a space between the microfibrils to a high extent. Of those, dimethyl sulfoxide is more preferred because the impregnability of the fibrillation solution can be further promoted.

The fibrillation solution may contain an aprotic polar solvent having a donor number of less than 26 to the extent that the effects of the present invention are not impaired. Examples of the aprotic polar solvent having a donor number of less than 26 that may be incorporated into the fibrillation solution include acetonitrile, dioxane, acetone, and tetrahydrofuran. When any such solvent is incorporated, its content in the fibrillation solution is, for example, 50 wt % or less.

B-1-3. Cellulose Modification Reaction Agent Except Carboxylic Acid Vinyl Ester

The fibrillation solution preferably further contains a cellulose modification reaction agent except the carboxylic acid vinyl ester (hereinafter sometimes referred to as "other modification reaction agent"). When the other cellulose modification reaction agent is further incorporated, the surfaces of the cellulose microfibrils can be chemically modified with two or more kinds of functional groups while the cellulose is fibrillated.

The other cellulose modification reaction agent in the fibrillation solution of this embodiment is used at any appropriate content as long as the impregnability of the fibrillation solution into the cellulose does not reduce. The content is, for example, 30 parts by weight or less, preferably from 0.1 part by weight to 30 parts by weight, more preferably from 0.1 part by weight to 20 parts by weight, still more preferably from 0.5 part by weight to 15 parts by weight with respect to 100 parts by weight of the fibrillation solution. When the content of the other modification reaction agent is excessively large, the fibrillation degree of the cellulose may reduce.

Any appropriate compound may be used as the other cellulose modification reaction agent. A carboxylic acid halide, a carboxylic acid anhydride, a carboxylic acid, an isocyanate, an epoxy, and an alkyl halide are preferably used. The other cellulose modification reaction agents may be used alone or in combination thereof.

In the embodiment in which the carboxylic acid vinyl ester is used, any one of the carboxylic acid, the epoxy, the isocyanate, and the alkyl halide is preferably used as the other modification reaction agent. When any one of the carboxylic acid halide and the carboxylic acid anhydride is used, the discoloration or decomposition reaction may occur.

Any appropriate compound may be used as the carboxylic acid halide. Examples thereof include a carboxylic acid chloride, a carboxylic acid bromide, and a carboxylic acid iodide. The carboxylic acid halide is specifically, for example, a carboxylic acid halide represented by the following formula (3):

$$R^3\text{—}C(=O)\text{—}X \qquad (3)$$

where $R^3$ represents an alkyl group having 1 to 24 carbon atoms, an alkylene group, a cycloalkyl group, or an aryl group, and X represents Cl, Br, or I.

More specific examples thereof include a carboxylic acid chloride, such as acetyl chloride, propionyl chloride, butyryl chloride, or benzoyl chloride; a carboxylic acid bromide, such as acetyl bromide, propionyl bromide, butyryl bromide, or benzoyl bromide; and a carboxylic acid iodide, such as acetyl iodide, propionyl iodide, butyryl iodide, or benzoyl iodide. A carboxylic acid halide except those described above may be used. Of those, a carboxylic acid chloride is preferably used in terms of reactivity and handleability. When the carboxylic acid halide is used, a catalyst to be described later may not be used.

Any appropriate compound may be used as the carboxylic acid anhydride. Examples thereof include: a carboxylic acid anhydride including: an anhydride of a saturated aliphatic monocarboxylic acid, such as propionic acid, (iso)butyric acid, or valeric acid; an anhydride of an unsaturated aliphatic monocarboxylic acid, such as (meth)acrylic acid or oleic acid; an anhydride of an alicyclic monocarboxylic acid, such as cyclohexanecarboxylic acid or tetrahydrobenzoic acid; and an anhydride of an aromatic monocarboxylic acid, such as benzoic acid or 4-methylbenzoic acid; a dibasic carboxylic acid anhydride including: a saturated aliphatic dicarboxylic acid anhydride, such as succinic anhydride or adipic anhydride; an unsaturated aliphatic dicarboxylic acid anhydride, such as maleic anhydride or itaconic anhydride; an alicyclic dicarboxylic acid anhydride, such as 1-cyclohexene-1,2-dicarboxylic anhydride, hexahydrophthalic anhydride, or methyltetrahydrophthalic anhydride; and an aromatic dicarboxylic acid anhydride, such as phthalic anhydride or naphthalic anhydride; and a polybasic carboxylic acid anhydride including a polycarboxylic acid (anhydride), such as trimellitic anhydride or pyromellitic anhydride. An aliphatic carboxylic acid anhydride having 4 or more carbon atoms or a carboxylic acid anhydride having an aryl group is preferred in terms of the hydrophobization of the fine cellulose fibers.

Any appropriate compound may be used as the isocyanate. The isocyanate is, for example, an isocyanate represented by the following formula (4) or (5):

$$R^4\!-\!N\!=\!C\!=\!O \quad (4)$$

$$O\!=\!C\!=\!N\!-\!R^5\!-\!N\!=\!C\!=\!O \quad (5)$$

where $R^4$ or $R^5$ represents an alkyl group having 1 to 24 carbon atoms, an alkylene group, a cycloalkyl group, or an aryl group.

The isocyanate is specifically, for example, an isocyanate, such as methyl isocyanate (MIC), diphenylmethane diisocyanate (MDI), hexamethylene diisocyanate (HDI), toluene diisocyanate (TDI), isophorone diisocyanate (IPDI), 2-isocyanatoethyl methacrylate (MOI), or 2-isocyanatoethyl acrylate (AOI). MOI and AOI are preferred in terms of compositing with an acrylic resin. In addition, MIC, MDI, HDI, TDI, or IPDI is preferred in terms of compositing with a urethane resin.

Any appropriate compound may be used as the epoxy. The epoxy may be, for example, at least one kind selected from the group consisting of epoxies each represented by the following formula (6) or (7):

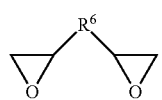 (6)

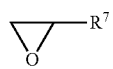 (7)

where $R^6$ or $R^7$ represents an alkyl group having 1 to 24 carbon atoms, an alkylene group, a substituent derived from ethylene glycol, a substituent derived from bisphenol A, a substituent derived from bisphenol F, a cycloalkyl group, or an aryl group.

Specific examples of the epoxy include: a monofunctional epoxy modification reaction agent, such as allyl glycidyl ether, 2-ethylhexyl glycidyl ether, glycidyl phenyl ether, 4-tert-butylphenyl glycidyl ether, or lauryl alcohol (EO) 15 glycidyl ether; and a bifunctional epoxy modification reaction agent, such as bisphenol A epoxy, bisphenol F epoxy, diglycidyl terephthalate, or diglycidyl o-phthalate. A bifunctional epoxy modification reaction agent is preferred in terms of compositing with an epoxy resin.

Any appropriate compound may be used as the alkyl halide. The alkyl halide is, for example, an alkyl halide represented by the following formula (8):

$$R^8\!-\!X \quad (8)$$

where $R^8$ represents an alkyl group having 1 to 24 carbon atoms, an alkylene group, a cycloalkyl group, a carboxylic acid alkyl group, or an aryl group, and X represents Cl, Br, or I.

Specific examples of the alkyl halide include chloroacetic acid, methyl chloride, ethyl chloride, and benzyl bromide. Chloroacetic acid is preferred in terms of the introduction of a hydrophilic carboxylic acid group into each of the surfaces of the fine cellulose fibers.

Any appropriate compound may be used as the carboxylic acid. The carboxylic acid is, for example, an aliphatic carboxylic acid or a carboxylic acid having an aryl group. The carboxylic acid is specifically, for example, a carboxylic acid represented by the following formula (9):

$$R^9\!-\!COOH \quad (9)$$

where $R^9$ represents an alkyl group having 1 to 24 carbon atoms, an alkylene group, a cycloalkyl group, or an aryl group.

The modification reaction agent may be used by being added to the fibrillation solution before its mixing with the cellulose in terms of the fibrillation property and the reactivity. Meanwhile, a modification reaction agent having a large number of carbon atoms (e.g., a modification reaction agent having 8 or more carbon atoms) may reduce the impregnability into a space between the microfibrils and the reactivity with a hydroxy group of the cellulose. Accordingly, the agent is preferably added to the fibrillation solution during the fibrillation or after the completion of the fibrillation. In addition, the modification reaction agent having a large number of carbon atoms is preferably used in combination with a modification reaction agent having a small number of carbon atoms.

B-1-4. Acid Catalyst or Base Catalyst

The fibrillation solution may further contain a base catalyst or an acid catalyst in accordance with the kind of the modification reaction agent. When the fibrillation solution contains the catalyst, the modification reaction of the fine cellulose fibers is promoted. In addition, the polarity of the fibrillation solution is improved, and hence the fibrillation can be further promoted. The base catalyst and the acid catalyst each have a high dielectric constant, and hence the addition of any such catalyst increases the dielectric constant of the fibrillation solution. Accordingly, the affinity of the fibrillation solution for the cellulose is improved, and hence the impregnation rate of the fibrillation solution and the swelling ratio of the cellulose increase. Further, any such catalyst may have an action of promoting the dissolution of a noncrystalline component in the cellulose, such as soluble hemicellulose, to accelerate the fibrillation into the microfibrils.

As described above, in the case where the fibrillation solution contains the carboxylic acid vinyl ester, when the catalyst is further added to the fibrillation solution, the cellulose is fibrillated. In addition, the carboxylic acid vinyl ester undergoes an ester exchange reaction with a hydroxy group of the cellulose, and hence modified fine cellulose fibers that are esterified are obtained. Although the catalyst may be any one of the acid catalyst and the base catalyst, the base catalyst is preferably used.

The content of the base catalyst or the acid catalyst in the fibrillation solution is preferably from 0.001 wt % to 30 wt % with respect to the entirety of the fibrillation solution.

In the case where the base catalyst is used, when the alkalinity of the base catalyst is excessively high, the fibrillation solution may be impregnated into the crystal of the cellulose to reduce the crystallinity degree of the fine cellulose fibers. Accordingly, any appropriate base catalyst that does not break the crystal structure of the cellulose may be used as the base catalyst. Preferred examples of the base catalyst include: a salt of an alkali metal or an alkaline earth metal, such as a carbonate, a hydrogen carbonate, a carboxylate, for example, an acetate, a borate, a phosphate, a hydrogen phosphate, or a tetraalkylammonium acetate; a pyridine; an imidazole; and an amine. Any such base catalyst is preferably incorporated because the incorporation has an effect of improving the polarity (dielectric constant) of the solvent to increase the impregnation rate of the solution. A catalyst that has strong basicity (is strongly alkaline) may reduce the stability of the cellulose. Accordingly, when the catalyst that has strong basicity is used, the content of the base catalyst in the fibrillation solution is preferably set to 0.1 wt % or less. The base catalysts may be used alone or in combination thereof.

When the addition amount of the base catalyst is excessively large, the crystallinity degree of the resultant cellulose microfibrils may reduce. With regard to the concentration (weight ratio) of the base catalyst in the fibrillation solution, the content of the base catalyst is, for example, from 0.001 wt % to 30 wt %, preferably from 0.001 wt % to 20 wt % with respect to the entirety of the fibrillation solution. In addition, when the base catalyst is a salt of an alkali metal or an alkaline earth metal, such as a carbonate, a hydrogen carbonate, a carboxylate, for example, an acetate, a borate, a phosphate, or a hydrogen phosphate, the content is preferably from 0.001 wt % to 8 wt %, more preferably from 0.05 wt % to 6 wt %. When a carbonate out of the salts is used, the content is preferably from 0.005 wt % to 5 wt %. When the base catalyst is a pyridine (in the case where a pyridine is not used as the solvent), an amine, or an imidazole, the content is preferably from 3 wt % to 20 wt %, more preferably from 10 wt % to 20 wt %. In the case where any such catalyst is used, the esterification reaction of the cellulose advances slowly as compared to the case where a salt of an alkali metal or an alkaline earth metal is used, and hence the esterification typically requires a long reaction time (e.g., 8 hours or more). In addition, in the case where a pyridine is used as the solvent, the pyridine also acts as a catalyst. However, also in this case, the esterification reaction advances slowly, and hence the esterification typically requires a long reaction time (e.g., 8 hours or more).

Any appropriate compound may be used as the acid catalyst. Preferred examples thereof include: paratoluenesulfonic acid; pyridiniumtoluenesulfonate; inorganic acids, suchassulfuric acid, hydrochloric acid, and phosphoric acid; and organic acids, such as oxalic acid and formic acid. Those acid catalysts may be used alone or in combination thereof.

The amount of the acid catalyst to be added to the fibrillation solution may be adjusted to any appropriate value in accordance with the kind of the catalyst to be used and the kind of the modification reaction agent. The addition amount is, for example, from 0.01 wt % to 30 wt %, preferably from 0.05 wt % to 20 wt %, more preferably from 0.1 wt % to 10 wt % with respect to the entirety of the fibrillation solution.

When sulfuric acid, paratoluenesulfonic acid, hydrochloric acid, or phosphoric acid is used as the acid catalyst, the addition amount is preferably 15 wt % or less with respect to the entirety of the fibrillation solution. In the case of oxalic acid or formic acid, the addition amount is more preferably 30 wt % or less. In addition, two or more kinds of the acid catalysts may be used in combination. In this case, the total content of the acid catalysts may be adjusted so as to be from 0.01 wt % to 30 wt %.

When the carboxylic acid vinyl ester and the other modification reaction agent are used in combination in the fibrillation solution, the base catalyst is preferably used as the catalyst.

B-2. Fibrillation Solution Containing Aldehyde

In one embodiment, the fibrillation solution of the present invention includes at least one kind of aldehyde selected from the group consisting of an aldehyde represented by the formula (1), paraformaldehyde, cinnamaldehyde (cinnamic aldehyde), perillaldehyde, vanillin, and glyoxal (dialdehyde), and an aprotic polar solvent having a donor number of 26 or more:

$$R^1\text{—CHO} \tag{1}$$

where $R^1$ represents a hydrogen atom, an alkyl group having 1 to 16 carbon atoms, an alkenyl group, a cycloalkyl group, or an aryl group.

B-2-1. Aldehyde

At least one kind of aldehyde selected from the group consisting of an aldehyde represented by the following formula (1), paraformaldehyde, cinnamaldehyde (cinnamic aldehyde), perillaldehyde, vanillin, and glyoxal (dialdehyde) is used as the aldehyde.

$$R^1\text{—CHO} \tag{1}$$

where $R^1$ represents a hydrogen atom, an alkyl group having 1 to 16 carbon atoms, an alkenyl group, a cycloalkyl group, or an aryl group.

Specific examples of the aldehyde include formaldehyde, paraformaldehyde, acetaldehyde, propionaldehyde, butanal, isobutanal, 2-methylbutanal, pentanal, hexanal, heptanal, octanal, nonanal, decanal, acrolein (vinylaldehyde), benzaldehyde, cinnamaldehyde (cinnamic aldehyde), perillaldehyde, vanillin, and glyoxal (dialdehyde). Those aldehydes may be used alone or in combination thereof.

In terms of the swelling property and fibrillation property of the cellulose, the aldehyde is preferably a lower aliphatic aldehyde, such as an aldehyde in which $R^1$ in the formula (1) represents a hydrogen atom or an alkyl group having 1 to 7 carbon atoms, more preferably a lower aliphatic aldehyde in which $R^1$ represents an alkyl group having 2 to 5 carbon atoms, still more preferably a lower aliphatic aldehyde in which $R^1$ represents an alkyl group having 2 to 4 carbon atoms. The use of such aldehyde can improve the impregnability of the solution into a space between the microfibrils and the reactivity thereof with a hydroxy group of the cellulose. When an aldehyde except the lower aliphatic aldehyde is used, the aldehyde is preferably used in combination with the lower aliphatic aldehyde from the viewpoint of securing the impregnability into a space between the microfibrils and the reactivity with a hydroxy group of the cellulose.

B-2-2. Aprotic Polar Solvent

Any appropriate solvent may be used as the aprotic polar solvent having a donor number of 26 or more. For example, any one of the solvents specifically described in the section B-1-2 may be used. In addition, an aprotic polar solvent having a donor number of less than 26 may be incorporated to the extent that the effects of the present invention are not impaired. Specific examples of the solvent include those listed for the fibrillation solution containing the carboxylic acid vinyl ester. When any such solvent is incorporated, its content in the fibrillation solution is, for example, 50 wt % or less.

B-2-3. Modification Reaction Agent

The fibrillation solution containing the aldehyde may further contain a modification reaction agent. Examples of the modification reaction agent include the modification reaction agents specifically described in the section B-1-3. The modification reaction agent in the fibrillation solution containing the aldehyde may be used at a content in the same range as that of the content disclosed for the fibrillation solution containing the carboxylic acid vinyl ester.

B-2-4. Base Catalyst or Acid Catalyst

The fibrillation solution containing the aldehyde may further contain a base catalyst or an acid catalyst in accordance with the kind of the modification reaction agent. Examples of the base catalyst or the acid catalyst include those specifically described in the section B-1-4. The range and the kind disclosed for the fibrillation solution containing the carboxylic acid vinyl ester may be used for, for example, the content of the base catalyst or the acid catalyst in the fibrillation solution containing the aldehyde, and the combination of the modification reaction agent and the catalyst.

In one embodiment, in the fibrillation solution containing the aldehyde, the acid catalyst or the base catalyst and the cellulose modification reaction agent are preferably used in combination with each other. When the catalyst is added to the fibrillation solution containing the cellulose modification reaction agent, the rate of a reaction between the modification reaction agent and a hydroxy group of the cellulose is promoted, and hence surface-modified fine cellulose fibers having a high modification ratio can be obtained.

When the base catalyst is used in combination with the modification reaction agent, its weight ratio in the fibrillation solution may be adjusted to any appropriate value in accordance with the kind of the catalyst to be used and the kind of the modification reaction agent. The weight ratio (content) is, for example, from 0.001 wt % to 30 wt % with respect to the entirety of the fibrillation solution. When the base catalyst is a salt of an alkali metal or an alkaline earth metal, such as a carbonate, a hydrogen carbonate, a carboxylate, for example, an acetate, a borate, a phosphate, or a hydrogen phosphate, the content is preferably from 0.001 wt % to 8 wt %, more preferably from 0.05 wt % to 6 wt % with respect to the entirety of the fibrillation solution. When a carbonate of an alkali metal or an alkaline earth metal is used, the content is preferably from 0.005 wt % to 5 wt %.

When the base catalyst is a pyridine (in the case where a pyridine is not used as the solvent), an amine, or an imidazole, the content is preferably from 3 wt % to 20 wt %, more preferably from 10 wt % to 20 wt % with respect to the entirety of the fibrillation solution. In the case where any such catalyst is used, the modification reaction of the fine cellulose fibers advances slowly as compared to the case where a salt of an alkali metal or an alkaline earth metal is used, and hence the modification typically requires a long reaction time (e.g., 8 hours or more). In addition, in the case where a pyridine is used as the solvent, the pyridine can also act as a catalyst. However, also in this case, the modification reaction advances slowly, and hence typically a long reaction time (e.g., 8 hours or more) is required or a reaction temperature needs to be increased for maintaining a reaction time.

In this embodiment, the amount of the acid catalyst to be added to the fibrillation solution may be adjusted to any appropriate value in accordance with the kind of the catalyst to be used and the kind of the modification reaction agent. The addition amount is, for example, from 0.01 wt % to 30 wt %, preferably from 0.05 wt % to 20 wt %, more preferably from 0.1 wt % to 10 wt % with respect to the entirety of the fibrillation solution. When sulfuric acid, paratoluenesulfonic acid, hydrochloric acid, or phosphoric acid is used as the acid catalyst, the addition amount is preferably 15 wt % or less with respect to the entirety of the fibrillation solution. In the case of oxalic acid or formic acid, the addition amount is more preferably 30 wt % or less. In addition, two or more kinds of the acid catalysts may be used in combination. In this case, the total content of the acid catalysts may be adjusted so as to be from 0.01 wt % to 30 wt %.

When the catalyst is used in combination with the modification reaction agent, any appropriate catalyst is selected in accordance with the modification reaction agent. For example, when a carboxylic acid anhydride, an isocyanate, or an epoxy is used as the modification reaction agent, the base catalyst is preferred.

The combination of the modification reaction agent and the catalyst is described in more detail. In the case where a carboxylic acid halide is used as the modification reaction agent, the base catalyst is preferred because the modification reaction can be further promoted. In this case, the content of the catalyst in the fibrillation solution is, for example, from 0.05 wt % to 10 wt %.

In the case where a carboxylic acid anhydride is used as the modification reaction agent, the base catalyst is preferred, and sodium carbonate, sodium hydrogen carbonate, lithium carbonate, lithium hydrogen carbonate, sodium acetate, potassium acetate, or the like is preferred. In this case, the content of the catalyst in the fibrillation solution is, for example, from 0.05 wt % to 8 wt %.

In the case where a carboxylic acid is used as the modification reaction agent, the acid catalyst is preferred. Specific examples thereof include sulfuric acid, hydrochloric acid, phosphoric acid, and p-toluenesulfonic acid. In this case, the content of the catalyst in the fibrillation solution is, for example, from 0.01 wt % to 10 wt %.

In the case where an isocyanate is used as the modification reaction agent, the base catalyst is preferred. The catalyst is, for example, an amine or imidazole. In this case, the content of the catalyst in the fibrillation solution is, for example, from 0.5 wt % to 20 wt %.

In the case where an epoxy is used as the modification reaction agent, the base catalyst is preferred. The catalyst is, for example, an amine or imidazole. In this case, the content of the catalyst in the fibrillation solution is, for example, from 0.5 wt % to 20 wt %.

In the case where an alkyl halide is used as the modification reaction agent, the base catalyst is preferred. Examples of the base catalyst include sodium hydroxide, potassium hydroxide, potassium carbonate, and sodium carbonate. In this case, the content of the catalyst in the fibrillation solution is, for example, from 0.5 wt % to 10 wt %.

C. Method of Preparing Fibrillation Solution

The fibrillation solution may be prepared by any appropriate method. The solution may be prepared by, for example, mixing the carboxylic acid vinyl ester or the aldehyde and the aprotic polar solvent having a donor number of 26 or more through stirring or the like.

When a modification reaction agent is further added to the fibrillation solution, the fibrillation solution may be prepared by, for example, mixing the solvent, the carboxylic acid vinyl ester or the aldehyde, and the modification reaction agent through stirring or the like to uniformly dissolve, in the solvent. With regard to the order in which the substances are mixed, all of the substances may be simultaneously added, or the substances may be sequentially added, while being stirred, to be mixed. A method involving sequentially adding the other substances to the solvent is typically used. When a modification reaction agent having low polarity is used, the impregnation rate of the fibrillation solution, and the swelling rate and fibrillation rate of the cellulose may reduce. Accordingly, the modification reaction agent is preferably added to the fibrillation solution under a state in which the fibrillation solution free of the modification reaction agent is impregnated into the cellulose to fibrillate the cellulose to some extent. In addition, when a modification reaction agent having a large number of carbon atoms is used as the modification reaction agent, the agent is preferably added during the fibrillation or after the completion of the fibrillation because the impregnability of the solution into a space between the microfibrils and the reactivity thereof with a hydroxy group of the cellulose may reduce.

When a catalyst is added to the fibrillation solution, the fibrillation solution may be prepared by, for example, mixing the solvent, the carboxylic acid vinyl ester or the aldehyde, and the catalyst through stirring or the like to uniformly dissolve or suspend, in the solvent. The addition of the catalyst can improve the polarity of the fibrillation solution to further promote the fibrillation. With regard to the order in which the substances are mixed, all of the substances may be simultaneously added, or the substances may be sequentially added, while being stirred, to be mixed. A method involving sequentially adding the other substances to the solvent is typically used. In addition, the catalyst may be added to the fibrillation solution under a state in which the fibrillation solution free of the catalyst is impregnated into the cellulose to fibrillate the cellulose to some extent.

When the modification reaction agent and the catalyst are used, the fibrillation solution may be prepared by, for example, mixing the solvent, the carboxylic acid vinyl ester or the aldehyde, the modification reaction agent, and the catalyst through stirring or the like to uniformly dissolve or suspend, in the solvent. With regard to the order in which the substances are mixed, all of the substances may be simultaneously added, or the substances may be sequentially added, while being stirred, to be mixed. In addition, the modification reaction agent and the catalyst may be added after the fibrillation solution containing the substances except the modification reaction agent and the catalyst has been impregnated into the cellulose. At this time, the modification reaction agent and the catalyst may be simultaneously added, or may be added in any appropriate order. Further, the catalyst may be added after the fibrillation solution containing the substances except the catalyst has been impregnated into the cellulose. In addition, the modification reaction agent may be added after the fibrillation solution containing the substances except the modification reaction agent has been impregnated into the cellulose.

In the preparation method, when the modification reaction agent and/or the catalyst is added after the fibrillation solution has been impregnated into the cellulose, the modification reaction agent and/or the catalyst may be directly added to the fibrillation solution, or the modification reaction agent and/or the catalyst may be dissolved in any appropriate solvent before the addition. Examples of the solvent include solvents each of which may be used as the solvent of the fibrillation solution.

D. Method of Fibrillating Cellulose

The production method of the present invention includes impregnating the cellulose with the fibrillation solution to fibrillate the cellulose. A possible reason why the cellulose is fibrillated by the fibrillation solution of the present invention is as described below. That is, the fibrillation solution may cleave hydrogen bonds between cellulose fibers, between lamellae, and between microfibrils, while being impregnated into the cellulose, to cause the fibrillation. As the donor number or electrical conductivity of the fibrillation solution increases, the volume of gaps between the cellulose fibers, between the lamellae, and between the microfibrils caused by the swelling of the cellulose may increase to improve the fibrillation degree of the cellulose.

When the fibrillation solution contains a carboxylic acid vinyl ester, the carboxylic acid vinyl ester reacts with a hydroxy group of the cellulose or water in the cellulose to produce acetaldehyde as a by-product. The acetaldehyde forms a hemiacetal or an acetal with part of the hydroxy groups on the surfaces of the microfibrils to cleave a hydrogen bond between the microfibrils. Accordingly, the microfibrils may be easily separated so that the cellulose may be fibrillated. In addition, when the fibrillation solution further contains a modification reaction agent, the hemiacetal or the acetal is unstable, and hence may be returned to acetaldehyde by the attack of the modification reaction agent to modify a hydroxy group of the cellulose.

When the fibrillation solution contains an aldehyde, the aldehyde forms a hemiacetal or an acetal with the hydroxy groups on the surfaces of the microfibrils to cleave a hydrogen bond between the microfibrils. Accordingly, the microfibrils may be easily separated so that the cellulose may be fibrillated. In addition, when the fibrillation solution further contains a modification reaction agent, the hemiacetal or the acetal is unstable, and hence may be returned to acetaldehyde by the attack of the modification reaction agent to modify a hydroxy group of the cellulose.

The cellulose to be used in the fibrillation may be in a form of cellulose alone, or may be in a mixed form containing a non-cellulose component, such as lignin or hemicellulose. The cellulose is preferably cellulose containing a type I crystal cellulose structure, and examples thereof include substances each containing wood-derived pulp, wood, bamboo, linter pulp, cotton, or cellulose powder.

A weight ratio "cellulose/fibrillation solution" between the cellulose and the fibrillation solution is, for example, from 0.5/99.5 to 25/75, preferably from 1.0/99.0 to 20/80, more preferably from 1.5/98.5 to 15/85, still more preferably from 2.0/98 to 15/85, particularly preferably from 2.0/98 to 12/88. In the case where the ratio of the cellulose is excessively small, the production efficiency of the cellulose microfibrils may reduce. In addition, in the case where the ratio of the cellulose is excessively large, there is a risk in that the impregnation of the fibrillation solution into spaces between the cellulose fibers, between the lamellae, and between the microfibrils is insufficient, and hence the fibrillation degree of the cellulose reduces. In addition, the viscosity increases, and hence a time period needed for a reaction between the cellulose and the solution lengthens. In each of those cases, productivity may reduce. Further, in the case where modified fine cellulose fibers are obtained, when the ratio of the cellulose is excessively large, the uniformity of the sizes and modification ratios of the resultant fine fibers may reduce.

In the production method of the present invention, any appropriate means may be used for cleaving the hydrogen bonds between the cellulose fibers, between the lamellae, and between the microfibrils, or for modifying the hydroxy groups on the surfaces of the fine cellulose fibers. Such chemical fibrillation method is, for example, a method involving preparing the fibrillation solution, and adding and mixing the cellulose to the prepared fibrillation solution.

The fibrillation solution has high impregnability into the cellulose. Accordingly, when the cellulose is added and mixed to the fibrillation solution, the fibrillation solution infiltrates into a space between the microfibrils to cleave hydrogen bonds between the microfibrils, and hence can fibrillate the cellulose. Further, the surfaces of the fine fibers can be modified by using a modification reaction agent and/or a catalyst in combination with the solution.

In the fibrillation of the cellulose, for example, the following may be performed: the fibrillation solution is mixed with the cellulose, and the mixture is left to stand for from 0.5 hour to 1 hour or more. In addition, after the mixing, stirring may be further performed to such an extent that the cellulose can maintain a uniform state in the fibrillation solution. Although the fibrillation is advanced merely by mixing the fibrillation solution with the cellulose and leaving the mixture to stand, stirring may be performed with stirring means for promoting the impregnation or uniformity of the fibrillation solution. Any appropriate apparatus may be used as a stirring machine. Typically, the apparatus only needs to be capable of stirring, blending, or kneading. For example, a stirring machine that has been generally used in organic synthesis may be typically used. A kneading machine, such as a kneader or an extruder, is also permitted. When the content of the cellulose is high, a kneader or an extruder that can correspond to a high viscosity is preferred. In addition, the stirring may be performed continuously or may be performed intermittently.

With regard to a reaction temperature in the fibrillation in the present invention, there is no need to heat the cellulose and the solution, and the cellulose and the solution only need to be caused to react with each other at room temperature. For example, when the cellulose and the solution are caused to react with each other for 2 hours or more, the cellulose can be chemically fibrillated as described above without the use of mechanical fibrillation means based on the action of a shear force. Accordingly, in the present invention, the cellulose can be fibrillated without the use of excess energy. Heating may be performed for promoting the reaction. A heating temperature is, for example, 90° C. or less, preferably 80° C. or less, more preferably 70° C. or less. In addition, the heating temperature is, for example, 40° C. or more. In particular, in the case of normal pressure, the temperature is 65° C. or less.

A fibrillation treatment time in the present invention may be set to any appropriate time in accordance with the donor number of the solvent in the fibrillation solution, the kind of the aldehyde or the carboxylic acid vinyl ester, and the kind of the catalyst. The time is, for example, from 0.5 hour to 50 hours, preferably from 1 hour to 36 hours, more preferably from 1.5 hours to 24 hours. When a lower aldehyde (e.g., acetaldehyde) or a lower carboxylic acid vinyl ester (e.g., vinyl acetate) and an aprotic polar solvent having a high donor number (e.g., dimethyl sulfoxide (DMSO)) are used, the time may be about several hours (e.g., 0.5 hour to 6 hours), and is preferably from about 1 hour to about 5 hours. Further, as described above, the reaction time may be shortened by increasing the treatment temperature (reaction temperature) or increasing the stirring rate of the cellulose and the solution. When the reaction time is excessively short, there is a risk in that the fibrillation solution is not sufficiently impregnated into a space between the microfibrils, and hence the reaction becomes insufficient and the fibrillation degree of the cellulose reduces. In addition, when the fibrillation solution contains the catalyst, the yield of the fine cellulose fibers may reduce owing to excessive modification due to an excessively long reaction time or an excessively high temperature. In addition, when the modification reaction agent is added in the middle of the reaction, the reaction is preferably further advanced for from 0.5 hour to 5 hour or more after the addition of the modification reaction agent.

The fibrillation of the cellulose is preferably performed in a closed system or a pressurized system in order that the evaporation of the carboxylic acid vinyl ester or the aldehyde may be avoided. Further, a reaction system is preferably pressurized in order that the evaporation of the carboxylic acid vinyl ester and a low-boiling point component, such as acetaldehyde serving as a by-product or an aldehyde, may be avoided.

The cellulose microfibrils obtained by the fibrillation may be separated and purified by any appropriate method. Examples of the method for the separation and purification include centrifugation, filtration, concentration, and precipitation. The cellulose microfibrils and the fibrillation solution may be separated from each other by, for example, centrifuging or filtering a fibrillation mixture (the fibrillation solution containing the fibrillated cellulose). Alternatively, the following may be performed: a solvent that can dissolve the catalyst and the aprotic solvent (e.g., water, an alcohol, or a ketone) is added to the fibrillation mixture, and the whole is separated and purified (washed) by a separation method (any appropriate method), such as centrifugation, filtration, or precipitation. A separation operation may be performed a plurality of times (e.g., about twice to about five times). When the modification reaction agent is added, the modification reaction agent may be deactivated with water, methanol, or the like after the completion of the reaction, or may be recovered by distillation and reused without being deactivated from the viewpoint of reuse.

E. Fine Cellulose Fibers

The cellulose microfibrils obtained by the production method of the present invention have a feature of having an average fiber diameter of from 2 nm to 800 nm and an aspect ratio of from 40 to 1,000.

The resultant cellulose microfibrils include cellulose fibrillated to nanosizes or submicron meters, and their average fiber diameter is, for example, from 2 nm to 800 nm, preferably from 3 nm to 600 nm, more preferably from 5 nm to 500 nm, still more preferably from 10 nm to 300 nm. When the fiber diameter is excessively large, an effect of the fine cellulose fibers as a reinforcing material may reduce. When the fiber diameter is excessively small, the handleability and heat resistance of each of the microfibrils may reduce.

A strong mechanical shear force is not applied to the resultant fine cellulose fibers, and hence the fine fibers have fiber lengths longer than those of microfibrils obtained by a conventional mechanical fibrillation method, and their average fiber length is, for example, 1 µm or more. In addition, although the average fiber length of the cellulose microfibrils to be obtained falls within the range of, for example, from about 1 µm to about 200 µm, fine cellulose fibers having an appropriate average fiber length may be obtained by controlling reaction conditions in accordance with their applications. In general, the average fiber length is, for example, from 1 µm to 100 µm, preferably from 2 µm to 60 µm, more preferably from 3 µm to 50 µm. When the fiber length is excessively short, the reinforcing effect and film-forming function of the fine fibers may reduce. In addition, when the fiber length is excessively long, there is a risk in that the fibers are liable to be entangled with each other, and hence their dispersibility in a solvent or a resin reduces.

The aspect ratio of the microfibrils may be easily controlled by the composition and impregnation time of the fibrillation solution. In general, the aspect ratio is preferably from 40 to 1,000. From the viewpoints of the dispersibility and the reinforcing effect, the aspect ratio is more preferably from 50 to 800, still more preferably from 80 to 600. A case in which the aspect ratio is less than 40 is not preferred because the reinforcing effect and the strength of a free-standing film formed of the fine fibers are low, though the fine fibers can be easily dispersed. Meanwhile, when the aspect ratio is more than 1,000, the dispersibility may reduce owing to the entanglement of the fibers.

In addition, the ratio (aspect ratio) of the average fiber length of the fine cellulose fubers to the average fiber diameter thereof may be changed in accordance with their applications. For example, when the fine fibers are composited with a resin, the aspect ratio may be, for example, from 40 to 1,000, preferably from 50 to 500, more preferably from 60 to 200, particularly preferably from 80 to 150. In addition, when the fine fibers are composited with a resin, the aspect ratio may be 50 or more.

F. Surface-Modified Fine Cellulose Fibers

Surface-modified fine cellulose fibers obtained by the production method of the present invention have a feature of having an average fiber diameter of from 2 nm to 800 nm and an aspect ratio of from 40 to 1,000, and being dispersible in an organic solvent or a resin having a SP value of 10 or less.

The average fiber diameter, aspect ratio, and average fiber length of the surface-modified fine cellulose fibers preferably fall within the same ranges as those of the above-mentioned fine cellulose fibers.

Any appropriate method may be used as a method of determining the average fiber diameter, average fiber length, and aspect ratio of the modified fine cellulose fibers. In this description, a method involving randomly selecting 50 fibers from an image of a scanning electron microscope photograph, and adding and averaging measured values to calculate a target value is used as the method of determining the average fiber diameter, average fiber length, and aspect ratio of the modified fine cellulose fibers.

In addition, fine fibers that are produced by a production method including using a fibrillation solution containing a carboxylic acid vinyl ester or any other cellulose modification reaction agent, and that are modified by esterification or the like can be dispersed in an organic solvent or a resin having a SP value of 10 or less.

Examples of the solvent having a SP value of 10 or less in which the fine fibers can be dispersed include acetone (9.9), 1,4-dioxane (10), 1-dodecanol (9.8), tetrahydrofuran (9.4), methyl ethyl ketone (MEK) (9.3), ethyl acetate (9.1), toluene (8.8), butyl acetate (8.7), and methyl isobutyl ketone (MIBK) (8.6). Examples of the resin having a SP value of 10 or less include polyurethane (10.0), an epoxy resin (9 to 10), polyvinyl chloride (9.5 to 9.7), polycarbonate (9.7), polyvinyl acetate (9.4), a polymethyl methacrylate resin (9.2), polystyrene (8.6 to 9.7), NBR rubber (8.8 to 9.5), polypropylene (8.0), and polyethylene (7.9).

The surfaces of the modified fine fibers obtained by the present invention are uniformly modified, and hence the fine fibers can be satisfactorily dispersed in an organic solvent or a resin. In particular, the dispersion of the fine fibers in a solvent or a resin having a SP value of 10 or less that cannot be achieved by the related art can be performed. A possible reason for the foregoing is as follows: the fine fibers of the present invention are modified in elongated states in the fibrillation solution, and hence hydroxy groups on their surfaces are modified without unevenness (uniformly); accordingly, the fine fibers can maintain the elongated states even after drying. Meanwhile, in the related art, in order that surface-modified fine cellulose fibers may be prepared, first, cellulose is fibrillated by strong mechanical pulverization or a strong shear force in water, and then a modification reaction is performed by replacing the water with an aprotic polar solvent, such as acetone or toluene. At the time of the solvent replacement, unmodified fine cellulose fibers are bonded to each other, gather, or are entangled with each other by themselves, and hence an aggregated state in which the fine fibers form a mass is established. Even when the fine fibers are loaded in the state into a reaction solvent, the fine fibers are present as an aggregate, and hence only a hydroxy group on the surface of the aggregate is modified. Accordingly, modified fibers to be obtained cannot be satisfactorily dispersed in a solvent or a resin.

The surface-modified fine cellulose fibers of the present invention can be used in applications in the fields of, for example, a paint, an adhesive, and a composited material. In addition, when the fine fibers are added to a resin, the fine fibers have a dispersion effect higher than that of related-art modified fine cellulose fibers. Accordingly, a reinforcing effect exhibited by the dispersion of the surface-modified fine cellulose fibers of the present invention in the resin can be expected to be improved.

Surface-modified fine cellulose fibers obtained by treatment with a fibrillation solution containing a carboxylic acid vinyl ester and a catalyst, or a fibrillation solution containing an aldehyde, a modification reaction agent, and a catalyst can be satisfactorily dispersed in an organic medium, such as an organic solvent or a resin, because the fine fibers are modified without unevenness. In order to cause the resin to effectively express the characteristics of surface-modified fine cellulose fibers (e.g., low linear expansion characteristics, strength, and heat resistance), surface-modified fine cellulose fibers each having high crystallinity are preferred.

The surface-modified fine cellulose fibers of the present invention are obtained by chemical fibrillation and can maintain the crystallinity of the raw material cellulose to a high extent, and hence reference can be directly made to a numerical value for the cellulose to be used for the crystallinity degree of the surface-modified fine cellulose fibers. The crystallinity degree of the surface-modified fine cellulose fibers is, for example, 50% or more, preferably from 50% to 98%, more preferably from 55% to 95%, still more preferably from 60% to 92%, particularly preferably from 65% to 90%. When the crystallinity degree is excessively small, the characteristics of the fine fibers, such as linear expansion characteristics and strength, may be reduced. The crystallinity degree may be measured by a method described in Examples to be described later.

The average degree of substitution of the surface-modified fine cellulose fibers (the average number of substituted hydroxy groups per glucose serving as a basic constituent unit for the cellulose) may vary depending on the diameters of the fine fibers and the kind of the modification reaction agent. The average degree of substitution is, for example, 1.5 or less, preferably from 0.02 to 1.2, more preferably from 0.05 to 1.2, still more preferably from 0.1 to 1.2, still more preferably from 0.15 to 1.0, still more preferably from 0.25 to 0.9, particularly preferably from 0.3 to 0.9. When the average degree of substitution is excessively large, the crystallinity degree of the fine fibers or the yield thereof may reduce. The average degree of substitution (DS) is the average number of substituted hydroxy groups per glucose serving as a basic constituent unit for the cellulose, and is disclosed in, for example, Biomacromolecules 2007, 8, 1973-1978, WO 2012/124652 A1, or WO 2014/142166 A1, the descriptions of which are incorporated herein by reference.

EXAMPLES

The present invention is described in more detail below on the basis of Examples. However, the present invention is not limited only to these Examples. Details about used raw materials are as described below, and the characteristics of the resultant modified fine cellulose fibers were measured as described below. In Example or Comparative Example in which the temperature at which fibrillation was performed was not specified, the fibrillation was performed at room temperature.

(Used Raw Materials, Catalysts, and Solvents)

Cellulose pulp: Pulp obtained by tearing commercial wood pulp (manufactured by Georgia-Pacific LLC, product name: FLUFF PULP ARC48000GP) into sizes that can be loaded into a sample bottle Other raw materials, catalysts, and solvents: Reagents manufactured by Nacalai Tesque, Inc.

<Fibrillation Degree Evaluation 1>

The fibrillation degree of the cellulose of each of carboxyl group-containing cellulose nanofibers obtained in Examples 1 to 11 and Comparative Examples 1 to 3 was observed with a FE-SEM ("JSM-6700F" manufactured by JEOL Ltd.) at a magnification in the range of from 25 to 50, 000, and was evaluated by the following criteria. The following measurement conditions were used: 20 mA and 60 seconds.

⊚: Substantially no fine fibers each having a fiber diameter of 500 nm or more are observed.

○: Most fiber diameters are 500 nm or less, but many fine fibers each having a fiber diameter of 500 nm or more are also observed.

x: Most fibers have the same fiber diameters as those of cellulose fibers serving as a raw material.

<Fibrillation Degree Evaluation 2>

The fibrillation degree of the cellulose of each of fine cellulose fibers obtained in Examples 12 to 22 and Comparative Examples 4 to 6 was observed with an optical microscope at a magnification in the range of 400, and was evaluated by the following criteria.

⊚: Substantially no fine fibers each having a fiber diameter of a submicron or more are observed.

○: Most fiber diameters are submicrons or less, but many fine fibers each having a fiber diameter of several microns or more are also observed.

x: Most fibers have the same fiber diameters as those of cellulose fibers serving as a raw material.

<Surface Modification Ratio or Average Degree of Substitution of Modified Cellulose Microfibrils>

The surface modification ratio of modified fine cellulose fibers was represented by an average degree of substitution, and was measured by solid-state NMR. The following two methods were used in combination with each other as a measurement mode: a solid $^{13}$C-CP/MAS method and a solid DP/MAS method. The average degree of substitution is the average of the number of substituted hydroxy groups (number of substituents) per repeating unit of cellulose.

The IR spectrum of fine cellulose fibers was measured with a Fourier transform infrared spectrophotometer (FT-IR). "NICOLET MAGNA-IR760 Spectrometer" manufactured by NICOLET was used in the measurement, and the result of the measurement was analyzed by a reflection mode.

<Shape Observation of Cellulose Fibers>

The shapes of fine cellulose fibers were observed with a FE-SEM ("JSM-6700F" manufactured by JEOL Ltd., measurement conditions: 20 mA and 60 seconds). The average fiber diameter and average fiber length of the fine fibers were each calculated by randomly selecting 50 fibers from an image of a SEM photograph, and adding and averaging measured values.

<Solvent Dispersibility>

0.05 g of dry fine cellulose fibers and 10 g of a solvent for dispersion (shown in Table 1) were loaded into a 20-milliliter sample bottle, and were stirred well with a stirrer. After that, when a uniform dispersion liquid was obtained, it was judged that the fine fibers were able to be dispersed in the solvent. Meanwhile, when the fine fibers were precipitated or remained in dry states (in a mass or chip state), it was judged that the fine fibers could not be dispersed in the solvent.

<Crystallinity Degree>

The crystallinity degree of the resultant fine cellulose fibers was measured with reference to Textile Res. J. 29: 786-794 (1959) by an XRD analysis method (Segal method), and was calculated from the following equation:

Crystallinity degree (%)=[($I200-IAM$)/$I200$]×100% where I200 represents the diffraction intensity of a lattice plane (002 plane) (diffraction angle 2θ=22.6°) in X-ray diffraction, and IAM represents the diffraction intensity of an amorphous portion (the lowest portion between the 002 plane and a 110 plane, diffraction angle 2θ=18.5°).

Example 1

1 g of vinyl acetate and 9 g of DMSO were loaded into a 20-milliliter sample bottle, and the mixed liquid was stirred with a magnetic stirrer until the mixed liquid became uniform. Next, 0.3 g of the cellulose pulp was added to the mixed liquid, and the whole was further stirred for 3 hours. After that, a fibrillation solution (vinyl acetate and DMSO) and a by-product (acetaldehyde or acetic acid) were removed by washing the resultant with distilled water. The presence or absence of the modification of the resultant fine cellulose fibers was confirmed by FT-IR analysis, their shapes were observed with a scanning electron microscope (SEM), their crystallinity degree was measured by the XRD analysis method, and their fibrillation degree and solvent dispersibility were evaluated. The result of the FT-IR analysis showed that the surfaces of the fine cellulose fibers were not modified. A SEM photograph of the fine fibers is shown in FIG. 1. As a result of the SEM observation, most fiber diameters were 100 nm or less, and the average fiber length of the fine fibers was 5 μm or more. As a result of the evaluation of dispersibility in water, it was confirmed that the fine fibers were able to be satisfactorily dispersed in water or dimethylacetamide.

Example 2

Fine cellulose fibers were obtained in the same manner as in Example 1 except that 0.01 g of sodium acetate was further added. The resultant fine cellulose fibers were evaluated in the same manner as in Example 1. With regard to the results of the evaluations, as shown in Table 1 and FIG. 2, the fiber diameters of the fine fibers were 100 nm or less, and a carbonyl group was confirmed by FT-IR analysis. Further, as a result of quantitative analysis by solid-state NMR, the average degree of ester substitution of the surfaces of the fine fibers was 0.25. In addition, it was confirmed that dry fine fibers were dispersed in dimethylacetamide or acetone.

Example 3

Fine cellulose fibers were obtained in the same manner as in Example 1 except that 0.01 g of potassium acetate was further added. The resultant cellulose microfibrils were evaluated in the same manner as in Example 1. With regard to the results of the evaluations, as shown in Table 1 and FIG. 3, the fiber diameters of the fine fibers were 100 nm or less, and the average degree of ester substitution of the surfaces of the fine fibers was 0.3. In addition, it was confirmed that dry fine fibers were dispersed in dimethylacetamide or acetone.

Example 4

Fine cellulose fibers were obtained in the same manner as in Example 1 except that 0.15 g of sodium hydrogen carbonate was further added. The resultant fine cellulose fibers were evaluated in the same manner as in Example 1. The fiber diameters of the fine fibers were 100 nm or less, and the average degree of ester substitution of the surfaces of the fine fibers was 0.42. In addition, it was confirmed that dry fine fibers were dispersed in dimethylacetamide, acetone, or tetrahydrofuran.

Example 5

Fine cellulose fibers were obtained in the same manner as in Example 1 except that 0.01 g of sodium carbonate was further added. The resultant fine cellulose fibers were evaluated in the same manner as in Example 1. The fiber diameters of the fine fibers were 100 nm or less, and the average degree of ester substitution of the surfaces of the fine fibers was 0.40. In addition, it was confirmed that dry fine fibers were dispersed in dimethylacetamide, acetone, or tetrahydrofuran.

Example 6

Fine cellulose fibers were obtained in the same manner as in Example 1 except that 0.01 g of potassium carbonate was further added. The resultant fine cellulose fibers were evaluated in the same manner as in Example 1. The fiber diameters of the fine fibers were 100 nm or less, and the average degree of ester substitution of the surfaces of the fine fibers was 0.53. In addition, it was confirmed that dry fine fibers were dispersed in dimethylacetamide, acetone, tetrahydrofuran, or methyl ethyl ketone.

Example 7

Fine cellulose fibers were obtained in the same manner as in Example 2 except that: 1 g of vinyl propionate was used instead of 1 g of vinyl acetate; and 0.02 g of sodium acetate was used instead of 0.01 g of sodium acetate. The resultant fine cellulose fibers were evaluated in the same manner as in Example 1. The fiber diameters of the fine fibers were 100 nm or less, and the average degree of ester substitution of the surfaces of the fine fibers was 0.43. In addition, it was confirmed that dry fine fibers were dispersed in dimethylacetamide, acetone, tetrahydrofuran, or methyl ethyl ketone.

Example 8

Fine cellulose fibers were obtained in the same manner as in Example 7 except that vinyl butyrate was used instead of vinyl propionate. The resultant cellulose microfibrils were evaluated in the same manner as in Example 7. The resultant cellulose microfibrils were evaluated in the same manner as in Example 7. The fiber diameters of the fine fibers were 100 nm or less, and the average degree of ester substitution of the surfaces of the fine fibers was 0.40. In addition, it was confirmed that dry fine fibers were dispersed in dimethylacetamide, acetone, tetrahydrofuran, or methyl ethyl ketone.

Example 9

Fine cellulose fibers were obtained in the same manner as in Example 4 except that the content of vinyl acetate and the content of DMSO were changed to 0.2 g and 9.8 g, respectively. The resultant fine cellulose fibers were evaluated in the same manner as in Example 4. The fiber diameters and modification ratio of the fine fibers were substantially identical to those of Example 4. In addition, it was confirmed that dry fine fibers were dispersed in dimethylacetamide, acetone, or tetrahydrofuran.

Example 10

Fine Cellulose fibers were obtained in the same manner as in Example 1 except that: the content of DMSO was changed from 9 g to 8 g; 1 g of pyridine was further added; and the stirring time was changed to 2 hours. The absorption band of a carbonyl group could not be confirmed by the IR spectrum of the fine fibers, but a SEM photograph of the resultant fine cellulose fibers is shown in FIG. 4. The fiber diameters of the fine fibers were smaller than those of Example 1. The solvent dispersibility thereof was substantially identical to that of Example 1, and hence the fine fibers were able to be dispersed in water or dimethylacetamide. It was revealed that the addition of pyridine was able to promote the fibrillation of the cellulose.

Example 11

Fine cellulose fibers were obtained in the same manner as in Example 3 except that the content of sodium carbonate was changed from 0.01 g to 0.08 g. The resultant fine cellulose fibers were evaluated in the same manner as in Example 3. The shapes of the fine fibers were substantially identical to those of the fine fibers obtained in Example 3, but their average degree of ester substitution increased to 0.51.

Comparative Example 1

Fibrillation was performed in the same manner as in Example 1 except that DMSO was changed to acetone. The pulp was hardly swollen. A solid content was recovered by performing washing in the same manner as in Example 1. An optical microscope photograph of the recovered solid content is shown in FIG. 5. Most fibers were large fibers each having a fiber diameter of from several micrometers to several tens of micrometers.

Comparative Example 2

Fibrillation was performed in the same manner as in Example 1 except that DMSO was changed to dioxane. The pulp was hardly swollen. A solid content was recovered by performing washing in the same manner as in Example 1. An optical microscope photograph of the recovered solid content is shown in FIG. 6. Most fibers were large fibers each having a fiber diameter of from several micrometers to several tens of micrometers.

Comparative Example 3

Fibrillation was performed in the same manner as in Example 1 except that vinyl acetate was changed to lauroyl chloride. A solid content was recovered by performing washing in the same manner as in Example 1. The average degree of ester substitution of the solid content was evaluated in the same manner as in Example 2. In addition, the shape of the solid content was observed with an optical microscope in the same manner as in Comparative Example 1. The result is shown in FIG. 7. Most fibers were large fibers each having a fiber diameter of from several micrometers to several tens of micrometers. The average degree of ester substitution of the solid content was 0.6. Accordingly, the modification reaction advanced on the surfaces of the fibers first and the fibrillation solution was not impregnated into the fibers, and hence the fibrillation hardly advanced.

The results of the evaluations of the modified cellulose microfibrils obtained in Examples and Comparative Examples are shown in Table 1.

resultant fine cellulose fibers was confirmed by FT-IR analysis, their fibrillation degree was observed with an optical microscope, and their crystallinity degree was measured by the XRD analysis method. The result of the FT-IR analysis (FIG. 8) showed that the surfaces of the fine cellulose fibers were not modified. A photograph of an optical microscope image of the fine fibers is shown in FIG. 9. The XRD analysis showed that the crystallinity degree of the fine cellulose fibers was 87%. As a result of the optical microscope observation, the fiber diameters of the fine cellulose fibers were submicrons or less. The resultant fine fibers were able to be dispersed in water again after having been dried at 105° C.

Example 13

Fine cellulose fibers were obtained in the same manner as in Example 12 except that the content of propionaldehyde in the fibrillation solution was set to 0.5 g. The resultant fine cellulose fibers were evaluated in the same manner as in Example 12. The shapes, crystallinity degree, and IR spectrum of the fine cellulose fibers were substantially identical to those of Example 12.

TABLE 1

| | Composition (weight ratio) | Fibrillation temperature/time | Fibrillation degree | Degree of ester substitution (DS) | Crystallinity degree (%) | Dispersibility (solvent) |
|---|---|---|---|---|---|---|
| Example 1 | Vinyl acetate/DMSO/pulp (1/9/0.3) | Room temperature/3 hr | ⊚ | 0 | 85 | ○ (Water) |
| Example 2 | Vinyl acetate/DMSO/sodium acetate/pulp (1/9/0.01/0.3) | Room temperature/3 hr | ⊚ | 0.25 | 81 | ○ (Acetone) |
| Example 3 | Vinyl acetate/DMSO/potassium acetate/pulp (1/9/0.01/0.3) | Room temperature/3 hr | ⊚ | 0.30 | 81 | ○ (Acetone) |
| Example 4 | Vinyl acetate/DMSO/sodium hydrogen carbonate/pulp (1/9/0.15/0.3) | Room temperature/3 hr | ⊚ | 0.42 | 80 | ○ (Acetone) |
| Example 5 | Vinyl acetate/DMSO/sodium carbonate/pulp (1/9/0.01/0.3) | Room temperature/3 hr | ⊚ | 0.40 | 80 | ○ (Acetone) |
| Example 6 | Vinyl acetate/DMSO/potassium carbonate/pulp (1/9/0.01/0.3) | Room temperature/3 hr | ⊚ | 0.53 | 80 | ○ (MEK) |
| Example 7 | Vinyl propionate/DMSO/sodium acetate/pulp (1/9/0.15/0.3) | Room temperature/3 hr | ⊚ | 0.43 | 80 | ○ (Acetone) |
| Example 8 | Vinyl butyrate/DMSO/sodium hydrogen carbonate/pulp (1/9/0.2/0.3) | Room temperature/3 hr | ○ | 0.40 | 83 | ○ (Acetone) |
| Example 9 | Vinyl acetate/DMSO/sodium hydrogen carbonate/pulp (0.2/9.8/0.15/0.3) | Room temperature/3 hr | ⊚ | 0.35 | 80 | ○ (Acetone) |
| Example 10 | Vinyl acetate/DMSO/pyridine/pulp (1/8/1/0.3) | Room temperature/2 hr | ⊚ | 0 | 82 | ○ (Water) |
| Example 11 | Vinyl acetate/DMSO/sodium carbonate/pulp (1/9/0.08/0.3) | Room temperature/3 hr | ⊚ | 0.51 | 80 | ○ (MEK) |
| Comparative Example 1 | Vinyl acetate/acetone/pulp (1/9/0.3) | Room temperature/3 hr | X | — | — | — |
| Comparative Example 2 | Vinyl acetate/dioxane/pyridine/pulp (1/9/1/0.3) | Room temperature/3 hr | X | X | — | — |
| Comparative Example 3 | Lauroyl chloride/DMSO/pulp (1/9/0.3) | Room temperature/3 hr | X | 0.6 | — | — |

Example 12

1 g of propionaldehyde and 9 g of DMSO were loaded into a 20-milliliter sample bottle, and the mixed liquid was stirred with a magnetic stirrer until the mixed liquid became uniform. Next, 0.35 g of the cellulose pulp was added to the mixed liquid, and the whole was further stirred for 3 hours. After that, a fibrillation solution (propionaldehyde and DMSO) was removed by washing the resultant with distilled water. The presence or absence of the modification of the Example 14

Fine cellulose fibers were obtained in the same manner as in Example 12 except that the content of propionaldehyde in the fibrillation solution was set to 0.1 g. The resultant fine cellulose fibers were evaluated in the same manner as in Example 12. The shapes, crystallinity degree, and IR spectrum of the fine cellulose fibers were substantially identical to those of Example 12.

Example 15

Fine cellulose fibers were obtained in the same manner as in Example 12 except that 1 g of acetic anhydride and 0.15 g of sodium hydrogen carbonate were further added to the fibrillation solution. The resultant fine cellulose fibers were evaluated in the same manner as in Example 12. A photograph of an optical microscope image of the fine fibers is shown in FIG. 10. The IR spectrum thereof is shown in FIG. 11. The average degree of ester substitution of the surfaces of the fine fibers was 0.32. In addition, it was confirmed that dry fine fibers were redispersed in dimethylacetamide or ethanol.

Example 16

Fine cellulose fibers were obtained in the same manner as in Example 15 except that 1.5 g of propionic anhydride was added instead of acetic anhydride. The resultant fine cellulose fibers were evaluated in the same manner as in Example 12. The average degree of ester substitution of the surfaces of the fine fibers was 0.25. In addition, it was confirmed that dry fine fibers were dispersed in dimethylacetamide or acetone.

Example 17

Fine cellulose fibers were obtained in the same manner as in Example 15 except that 1.8 g of butyric anhydride was added instead of acetic anhydride. The resultant fine cellulose fibers were evaluated in the same manner as in Example 12. The average degree of ester substitution of the surfaces of the fine fibers was 0.20. In addition, it was confirmed that dry fine fibers were dispersed in dimethylacetamide or acetone.

Example 18

Fine cellulose fibers were washed in the same manner as in Example 12 except the following: propionaldehyde and moisture were distilled after the fibrillation; and then 6 g of N-methyl-2-pyrrolidone (NMP), 1.5 g of 2-isocyanatoethyl methacrylate (MOI), and 0.8 g of triethylamine were added to the residue, and the mixture was stirred at 60° C. for 2 hours. The resultant fine cellulose fibers were evaluated in the same manner as in Example 12. A photograph of an optical microscope image of the microfibrils is shown in FIG. 12, and the IR spectrum thereof is shown in FIG. 13. The shapes and crystallinity degree of the fine fibers were substantially identical to those of the fine fibers obtained in Example 12. FT-IR analysis confirmed that the surfaces of the fine fibers were able to be modified with MOI because the absorption band of an ester bond (C=O) at a frequency around from 1,700 $cm^{-1}$ to 1,760 $cm^{-1}$ and the absorption band of an isocyanate bond at a frequency around 1,550 $cm^{-1}$ were strongly detected. In addition, it was confirmed that dry fine fibers were dispersed in acetone and methyl ethyl ketone.

Example 19

Fine cellulose fibers were obtained in the same manner as in Example 12 except that: the content of DMSO was changed from 9 g to 8 g; and 1 g of pyridine was further added. The resultant fine cellulose fibers were evaluated in the same manner as in Example 12. The IR spectrum of the fine fibers was identical to that of Example 12, but it was revealed from an optical microscope image thereof (FIG. 14) that the fibrillation degree thereof was able to be improved as compared to that of Example 12.

Example 20

Fine cellulose fibers were obtained in the same manner as in Example 15 except that sodium carbonate was used instead of sodium hydrogen carbonate. The resultant cellulose microfibrils were evaluated in the same manner as in Example 15. The shapes, crystallinity degree, and modification ratio of the fine fibers were substantially identical to those of the fine fibers obtained in Example 15.

Example 21

Fine cellulose fibers were obtained in the same manner as in Example 15 except that sodium acetate was used instead of sodium hydrogen carbonate. The resultant fine cellulose fibers were evaluated in the same manner as in Example 15. The shapes, crystallinity degree, and modification ratio of the fine fibers were substantially identical to those of the fine fibers obtained in Example 15.

Example 22

Fine cellulose fibers were obtained in the same manner as in Example 15 except that potassium acetate was used instead of sodium hydrogen carbonate. The resultant fine cellulose fibers were evaluated in the same manner as in Example 15. The shapes, crystallinity degree, and modification ratio of the fine fibers were substantially identical to those of the fine fibers obtained in Example 15.

Comparative Example 4

Fibrillation was performed in the same manner as in Example 12 except that acetone was used instead of DMSO. The pulp remained in a chip state, and was not dispersed or swollen at all.

Comparative Example 5

Fibrillation was performed in the same manner as in Example 12 except that dioxane was used instead of DMSO. As in Comparative Example 4, the pulp substantially remained in a chip state, and was not dispersed or swollen at all. A solid content was recovered by performing washing in the same manner as in Example 12. The external appearance of the recovered solid content was substantially identical to that of Comparative Example 4.

Comparative Example 6

Fibrillation was performed in the same manner as in Example 12 except that propionaldehyde was not added. A solid content was recovered by performing washing in the same manner as in Example 12. The shape of the solid content was observed with an optical microscope in the same manner as in Example 12. A photograph of an optical microscope image of the solid content is shown in FIG. 15. It was revealed that part of the fibers were fibrillated to submicron sizes, but many large fibers each having a fiber diameter of from several micrometers to several tens of micrometers remained.

TABLE 2

| | Composition (weight ratio) | Fibrillation temperature/time | Fibrillation degree | Degree of ester substitution (DS) |
|---|---|---|---|---|
| Example 12 | Propionaldehyde/DMSO/pulp (1/9/0.35) | Room temperature/3 hr | ⊚ | 0 |
| Example 13 | Propionaldehyde/DMSO/pulp (0.5/9/0.35) | Room temperature/3 hr | ⊚ | 0 |
| Example 14 | Propionaldehyde/DMSO/pulp (0.1/9/0.35) | Room temperature/3 hr | ⊚ | 0 |
| Example 15 | Propionaldehyde/DMSO/acetic anhydride/sodium hydrogen carbonate/pulp (1/9/1/0.15/0.35) | Room temperature/3 hr | ⊚ | 0.32 |
| Example 16 | Propionaldehyde/DMSO/propionic anhydride/sodium hydrogen carbonate/pulp (1/9/1.5/0.15/0.35) | Room temperature/3 hr | ⊚ | 0.25 |
| Example 17 | Propionaldehyde/DMSO/butyric anhydride/sodium hydrogen carbonate/pulp (1/9/1.8/0.15/0.35) | Room temperature/3 hr | ⊚ | 0.20 |
| Example 18 | Propionaldehyde/DMSO/MOI/TEA/pulp (1/9/1.5/0.8/0.35)* | Room temperature/3 hr | ⊚ | — |
| Example 19 | Propionaldehyde/DMSO/pyridine/pulp (1/8/1/0.35) | Room temperature/3 hr | ⊚ | 0 |
| Example 20 | Propionaldehyde/DMSO/acetic anhydride/sodium carbonate/pulp (1/9/1/0.15/0.35) | Room temperature/3 hr | ⊚ | 0.35 |
| Example 21 | Propionaldehyde/DMSO/acetic anhydride/sodium acetate/pulp (1/9/1/0.15/0.35) | Room temperature/3 hr | ⊚ | 0.33 |
| Example 22 | Propionaldehyde/DMSO/acetic anhydride/potassium acetate/pulp (1/9/1/0.15/0.35) | Room temperature/3 hr | ⊚ | 0.36 |
| Comparative Example 4 | Propionaldehyde/acetone/pulp (1/9/0.35) | Room temperature/3 hr | X | 0 |
| Comparative Example 5 | Propionaldehyde/dioxane/pulp (1/9/0.35) | Room temperature/3 hr | X | 0 |
| Comparative Example 6 | DMSO/pulp (9/0.35) | Room temperature/3 hr | X | 0 |

*MOI: 2-isocyanatoethyl methacrylate, TEA: triethylamine

As is apparent from the results of Table 1 and Table 2, while the fibrillation advanced in each of the cellulose microfibrils obtained in Examples, the fibrillation hardly advanced in each of the modified cellulose microfibrils obtained in Comparative Examples.

INDUSTRIAL APPLICABILITY

The cellulose microfibrils and the modified cellulose microfibrils obtained by the production method of the present invention can be utilized in various composite materials and coating agents, and can also be utilized by being formed into a sheet or a film.

The invention claimed is:

1. A method of producing fine cellulose fibers, comprising impregnating cellulose with a fibrillation solution and without use of strong fibrillation equipment, the fibrillation solution containing an aprotic solvent having a donor number of 26 or more and a carboxylic acid vinyl ester or an aldehyde to fibrillate the cellulose, the aldehyde being at least one kind of aldehyde selected from the group consisting of an aldehyde represented by the following formula (1), paraformaldehyde, cinnamaldehyde, perillaldehyde, vanillin, and glyoxal:

$$R^1-CHO \quad (1)$$

where $R^1$ represents a hydrogen atom, an alkyl group having 1 to 16 carbon atoms, an alkenyl group, a cycloalkyl group, or an aryl group.

2. The production method according to claim 1, wherein a content of the carboxylic acid vinyl ester or the aldehyde is from 0.05 wt % to 50 wt % with respect to an entirety of the fibrillation solution.

3. The production method according to claim 1, wherein the aprotic solvent having a donor number of 26 or more is at least one kind selected from the group consisting of a sulfoxide, a pyridine, a pyrrolidone, and an amide.

4. The production method according to claim 1, wherein the aldehyde is at least one kind selected from the group consisting of formaldehyde, paraformaldehyde, acetaldehyde, propionaldehyde, butanal, isobutanal, 2-methylbutanal, pentanal, hexanal, heptanal, octanal, nonanal, decanal, acrolein, benzaldehyde, cinnamaldehyde, perillaldehyde, vanillin, and glyoxal.

5. The production method according to claim 1, wherein the carboxylic acid vinyl ester is at least one kind selected from the group consisting of vinyl acetate, vinyl propionate, vinyl butyrate, vinyl caproate, vinyl cyclohexanecarboxylate, vinyl caprylate, vinyl caprate, vinyl laurate, vinyl myristate, vinyl palmitate, vinyl stearate, vinyl pivalate, vinyl octylate, divinyl adipate, vinyl methacrylate, vinyl crotonate, vinyl pivalate, vinyl octylate, vinyl benzoate, and vinyl cinnamate.

6. The production method according to claim 1, wherein the carboxylic acid vinyl ester comprises a compound represented by the following formula (2):

$$R^2-COO-CH=CH_2 \quad (2)$$

where $R^2$ represents an alkyl group having 1 to 24 carbon atoms, an alkylene group, a cycloalkyl group, or an aryl group.

7. The production method according to claim 1, wherein the fibrillation solution further contains a cellulose modification reaction agent.

8. The production method according to claim 7, wherein the cellulose modification reaction agent is at least one kind selected from the group consisting of a carboxylic acid halide, a carboxylic acid anhydride, a carboxylic acid, an isocyanate, an epoxy, and an alkyl halide.

9. The production method according to claim 1, wherein the fibrillation solution further contains an acid catalyst or a base catalyst.

10. The production method according to claim 9, wherein the acid catalyst is at least one kind selected from the group consisting of paratoluenesulfonic acid, pyridinium paratoluenesulfonate, an inorganic acid, and an organic acid.

11. The production method according to claim 9, wherein the base catalyst is at least one kind selected from the group consisting of: a carbonate of an alkali metal or an alkaline earth metal; a hydrogen carbonate of an alkali metal or an alkaline earth metal; a carboxylate of an alkali metal or an alkaline earth metal; a borate of an alkali metal or an alkaline earth metal; a phosphate of an alkali metal or an alkaline earth metal; a hydrogen phosphate of an alkali metal or an alkaline earth metal; a tetraalkylammonium acetate of an alkali metal or an alkaline earth metal; a pyridine; an imidazole; and an amine.

12. The production method according to claim 9, wherein a content of the acid catalyst or the base catalyst is from 0.001 wt % to 30 wt % with respect to an entirety of the fibrillation solution.

13. The production method according to claim 1, wherein a weight ratio between the cellulose and the fibrillation solution is from 0.5/99.5 to 25/75.

14. The production method according to claim 1, wherein the impregnating cellulose with a fibrillation solution is performed with stirring.

* * * * *